(12) United States Patent
Nania

(10) Patent No.: US 12,703,437 B2
(45) Date of Patent: Aug. 11, 2026

(54) MULTI-FUNCTION CARGO MAXIMIZING APPARATUS

(71) Applicant: Ford Global Technologies, LLC, Dearborn, MI (US)

(72) Inventor: Adrian Nania, Rochester, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 380 days.

(21) Appl. No.: 18/122,876

(22) Filed: Mar. 17, 2023

(65) Prior Publication Data

US 2024/0308596 A1 Sep. 19, 2024

(51) Int. Cl.
*B62D 33/033* (2006.01)
*B62D 33/02* (2006.01)

(52) U.S. Cl.
CPC ....... *B62D 33/033* (2013.01); *B62D 33/0207* (2013.01)

(58) Field of Classification Search
CPC .... B62D 33/033; B62D 33/0207; B60R 5/041
See application file for complete search history.

(56) References Cited

U.S. PATENT DOCUMENTS 4,733,898 A * 3/1988 Williams ............... B62D 33/02 296/24.32
5,232,259 A 8/1993 Booker
8,237,557 B1 * 8/2012 Hertz ....................... B60Q 7/02 340/468
8,240,527 B1 8/2012 Casselton
8,342,347 B2 * 1/2013 Hay .................. B65D 11/1866 312/258
9,132,786 B2 * 9/2015 Roach ..................... B60R 9/065
9,387,806 B2 * 7/2016 Bzoza ..................... B60R 5/041
9,481,316 B2 * 11/2016 Faruque .................... B60R 9/06
9,789,913 B2 * 10/2017 Singer ................ B62D 33/0273
10,029,741 B2 * 7/2018 Singer ................ B62D 33/0273
11,427,263 B1 8/2022 Dusold
2006/0214449 A1 * 9/2006 Klusmeier ......... B62D 33/0273 296/26.11
2009/0309381 A1 * 12/2009 Nelson ............... B62D 33/0273 296/26.11
2010/0264180 A1 * 10/2010 Allotey .................. B60R 11/06 224/404
2022/0055543 A1 2/2022 Gardner

* cited by examiner

*Primary Examiner* — Derek J Battisti

(74) *Attorney, Agent, or Firm* — Vichit Chea; Carlson, Gaskey & Olds, P.C.

(57) ABSTRACT

A vehicle cargo bed extender system is comprised of a plurality of panels that are coupled together such that the panels are configurable between a plurality of use positions including at least a stowed position and an extended position. When in the stowed position, the plurality of panels are stored within a cargo bed floor. When in the extended position, the plurality of panels provide an extended work surface that extends outwardly beyond the cargo bed floor.

26 Claims, 18 Drawing Sheets

22
56
52
54
42
60
58
14

26
44
92
94
68
40
32
48
84
34
56
52
58
82
88
44
28
58
54
86
22
50
58
36
88
44
24
58
38
46
42
58
30

MULTI-FUNCTION CARGO MAXIMIZING APPARATUS

TECHNICAL FIELD

This disclosure relates generally a cargo bed system for a vehicle and, more particularly, to a cargo bed extender system that is foldable within a truck bed floor surface and provides multiple functions.

BACKGROUND

Vehicles transport various types of cargo. Vehicle cargo beds, such as in a pick-up truck for example, can vary in size. As passenger cabin size increases, cargo bed size may decrease. There is a need for innovative ways to transport larger items.

SUMMARY

In some aspects, the techniques described herein relate to a vehicle cargo bed extender system, including: a plurality of panels coupled together such that the panels are configurable between a plurality of use positions including at least a stowed position and an extended position, wherein when in the stowed position the plurality of panels are stored within a cargo bed floor, and when in the extended position the plurality of panels provide an extended work surface that extends outwardly beyond the cargo bed floor.

In some aspects, the techniques described herein relate to a vehicle cargo bed extender system, wherein the plurality of use positions further comprises at least one of a cargo divider wall, an aero wing, a load stop, a sealed bed extender, a secured vault, or an extended table surface that extends beyond the extended work surface.

In some aspects, the techniques described herein relate to a vehicle cargo bed extender system, wherein the plurality of use positions comprises at least a cargo divider wall, an aero wing, a load stop, a sealed bed extender, a secured vault, and an extended table surface that extends beyond the extended work surface.

In some aspects, the techniques described herein relate to a vehicle cargo bed extender system, wherein the plurality of panels comprises at least a box bottom panel that is mounted for pivotal movement relative to the cargo bed floor, a box rear panel that is mounted for pivotal movement relative to the box bottom panel, a box top panel that is mounted for pivotal movement relative to the box rear panel, a first side panel that is mounted for pivotal movement relative to the box bottom panel, and a second side panel that is mounted for pivotal movement relative to the box bottom panel.

In some aspects, the techniques described herein relate to a vehicle cargo bed extender system, wherein the box bottom panel comprises a first lateral edge configured to extend along a width of the cargo bed floor, a second lateral edge opposite the first lateral edge, a first longitudinal edge connecting the first lateral edge to the second lateral edge along one side of the box bottom panel, and a second longitudinal edge connecting the first lateral edge to the second lateral edge along an opposite side of the box bottom panel, and including:

- a primary hinge assembly that pivotally couples the first lateral edge of the box bottom panel to the cargo bed floor;
- at least one second hinge that pivotally couple the second lateral edge of the box bottom panel to the box rear panel;
- at least one third hinge that pivotally couples the first longitudinal edge of the box bottom panel to the first side panel;
- at least one fourth hinge that pivotally couples the second longitudinal edge of the box bottom panel to the second side panel; and
- a secondary hinge assembly that pivotally couples the box top panel to the box rear panel.

In some aspects, the techniques described herein relate to a vehicle cargo bed extender system, wherein the primary hinge assembly, the at least one second hinge, the at least one third hinge, the at least one fourth hinge, and the secondary hinge assembly all operate independently of each other.

In some aspects, the techniques described herein relate to a vehicle cargo bed extender system that includes at least one mounting bracket that includes at least a first flange to fix the bottom box panel to the cargo bed floor and a second flange that includes a primary hinge assembly that is coupled to the box bottom panel such that the plurality of panels can pivot relative to the cargo bed floor as a single unit when moving to the stowed position.

In some aspects, the techniques described herein relate to a vehicle cargo bed extender system, wherein when the plurality of panels are in the stowed position, the box top panel is generally flush with the cargo bed floor, and wherein to provide a cargo divider wall within a cargo bed area, the box rear panel and box top panel are rotated together as a unit away from the box bottom panel to an upright position.

In some aspects, the techniques described herein relate to a vehicle cargo bed extender system, wherein to provide an aero wing, the plurality of panels are rotated as a unit from the stowed position to an upright vertical position with the box rear panel and box top panel being subsequently rotated as a unit to a horizontal position relative to the box bottom panel which remains in the upright vertical position.

In some aspects, the techniques described herein relate to a vehicle cargo bed extender system, wherein to provide the extended work surface, the plurality of panels are rotated 180 degrees From a first horizontal orientation, within a cargo bed area when in the stowed position, to a second horizontal orientation that extends a work surface beyond a distal edge of the cargo bed area.

In some aspects, the techniques described herein relate to a vehicle cargo bed extender system, wherein to provide a further extended work surface, the plurality of panels are rotated as a unit from the stowed position to an upright vertical position with the box rear panel and box top panel being subsequently rotated as a unit away from the box bottom panel such that the box bottom panel can then be rotated to a horizontal position to provide the work surface, and the unit of the box rear panel and box top panel can be rotated to a horizontal position to provide the further extended work surface that extends outwardly beyond the work surface.

In some aspects, the techniques described herein relate to a vehicle cargo bed extender system, wherein to provide a load stop, the plurality of panels are rotated as a unit from the stowed position to an upright vertical position with the box rear panel and box top panel being subsequently rotated as a unit away from the box bottom panel such that the box bottom panel can then be rotated to a horizontal position to provide an extended cargo bed area, and the unit of the box rear panel and box top panel can be rotated to a vertical position to provide the load stop at a distal end of the extended cargo bed area.

In some aspects, the techniques described herein relate to a vehicle cargo bed extender system, wherein to provide a sealed enclosure, when in a load stop position, the box top panel is rotated away from the box rear panel to a position parallel with the box bottom panel, and the first and second side panels are rotated upwardly relative to the box bottom panel to upright vertical positions to provide the sealed enclosure with only one open end that faces a cargo bed area.

In some aspects, the techniques described herein relate to a vehicle cargo bed extender system, wherein to provide a secured vault, the sealed enclosure is rotated as a single unit into the cargo bed area such that the one open end is enclosed by the cargo bed floor.

In some aspects, the techniques described herein relate to a vehicle cargo bed extender system that includes at least one striker loop mounted to one of the plurality of panels, wherein the at least one striker loop is configured to selectively latch to a vehicle tailgate.

In some aspects, the techniques described herein relate to a vehicle cargo bed system, including: a floor; first and second side walls extending up from opposing sides of the floor; a tailgate mounted for pivoting movement relative to the floor, wherein the tailgate is moveable between an upright position where the tailgate cooperates with the first and second side walls to enclose an end of a cargo bed area and an open position to allow access to the cargo bed area; and an extender structure mounted for pivoting movement relative to the floor to increase a size of the cargo bed area when the tailgate is in the open position, wherein the extender structure comprises a plurality of panels coupled together such that the panels are configurable between a plurality of use positions including at least a stowed position and an extended position, wherein when in the stowed position the plurality of panels are stored within the floor, and when in the extended position the plurality of panels provide an extended work surface that extends outwardly beyond the floor.

In some aspects, the techniques described herein relate to a vehicle cargo bed system that includes a recessed area formed within the floor such that when in the stowed position an outermost surface of the plurality panels is generally flush with the floor.

In some aspects, the techniques described herein relate to a vehicle cargo bed system, wherein the plurality of panels comprises at least a box bottom panel that is mounted for pivotal movement relative to the floor, a box rear panel that is mounted for pivotal movement relative to the box bottom panel, a box top panel that is mounted for pivotal movement relative to the box rear panel, a first side panel that is mounted for pivotal movement relative to the box bottom panel, and a second side panel that is mounted for pivotal movement relative to the box bottom panel.

In some aspects, the techniques described herein relate to a method, including: coupling a plurality of panels coupled together such that the panels are configurable between a plurality of use positions including at least a stowed position and an extended position; storing the plurality of panels within a cargo bed floor when in the stowed position; and pivoting the plurality of panels to provide an extended work surface that extends outwardly beyond the cargo bed floor when in the extended position.

In some aspects, the techniques described herein relate to a method that includes pivoting the plurality of panels to provide one or more of the following plurality of use positions:

at least one of a cargo divider wall, an aero wing, a load stop, a sealed bed extender, a secured vault, or an extended table surface that extends beyond the extended work surface.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details a utility bed system for a vehicle and, more particularly, to a vehicle cargo bed extender system that is foldable within a cargo bed floor surface and provides multiple functions. In one example, the vehicle comprises a truck; however, the cargo bed extender system could also be used in other vehicles such as passenger cars, sport utility vehicles, vans, etc.

Figure 1:
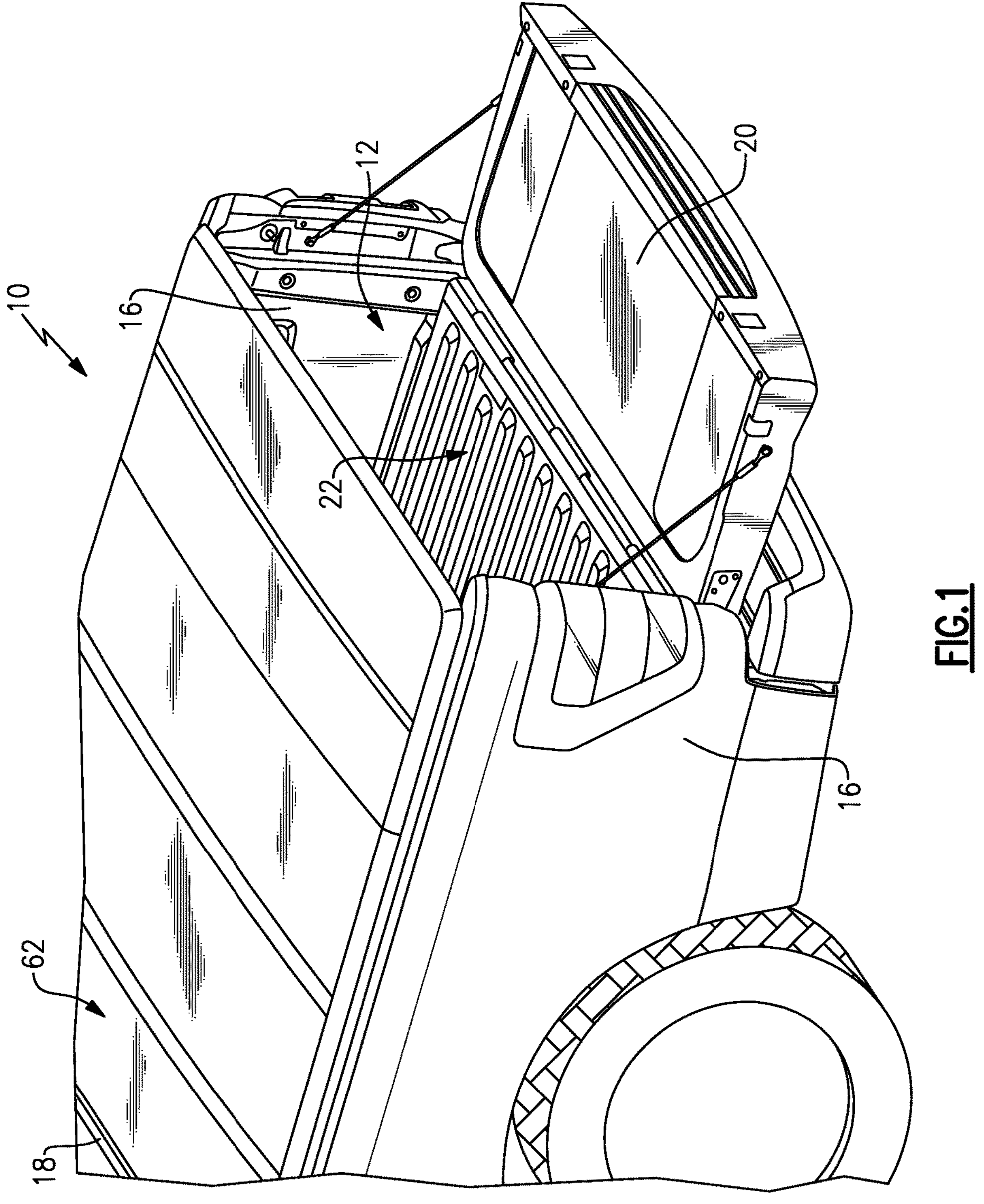
FIG. 1 illustrates a perspective view of a truck bed with a tailgate in a lowered position and a cargo bed extender system in a stowed position.

With reference to FIG. 1, a vehicle 10 has a bed 12 with a floor 14 (FIG. 3), side walls 16, a forward wall 18 extending along a fore edge of the floor 14, and a rear wall or tailgate 20 that cooperate with each other to define an open cargo area. The vehicle 10 has a cargo bed extender system 22 that is moveable between a deployed position and a stowed position where the system 22 is stored in the bed floor 14 until it is needed. In the stowed position, an outermost surface of the system 22 is generally flush with, e.g. aligned with, the bed floor 14 such that any cargo in the cargo area can be easily slid in and out of the bed 12 without any interference. Once fully deployed, the bed extender structure 22 serves as a bed extender to increase cargo space but also has additional functions.

The tailgate 20 is movable between an upright position where the tailgate 20 cooperates with the first and second side walls 16 to enclose an end of the cargo bed area (FIG. 8), and a lowered position or open position, as shown in FIG. 1, to allow access to the cargo bed area. In one example, the a cargo bed extender system 22 comprises a plurality of panels that are coupled together such that the panels are configurable to be moved between a plurality of use positions. In one example, the use positions include at least the stowed position and an extended position where an extended work surface is provided that extends outwardly beyond the cargo bed floor 14. Examples of additional use positions include a cargo divider wall, an aero wing, a load stop, a sealed bed extender, a secured vault, and/or an extended table surface that extends beyond the extended work surface. Additional use positions and/or functions may also be provided. The use positions will be described in greater detail below.

Figures 2, 2A:
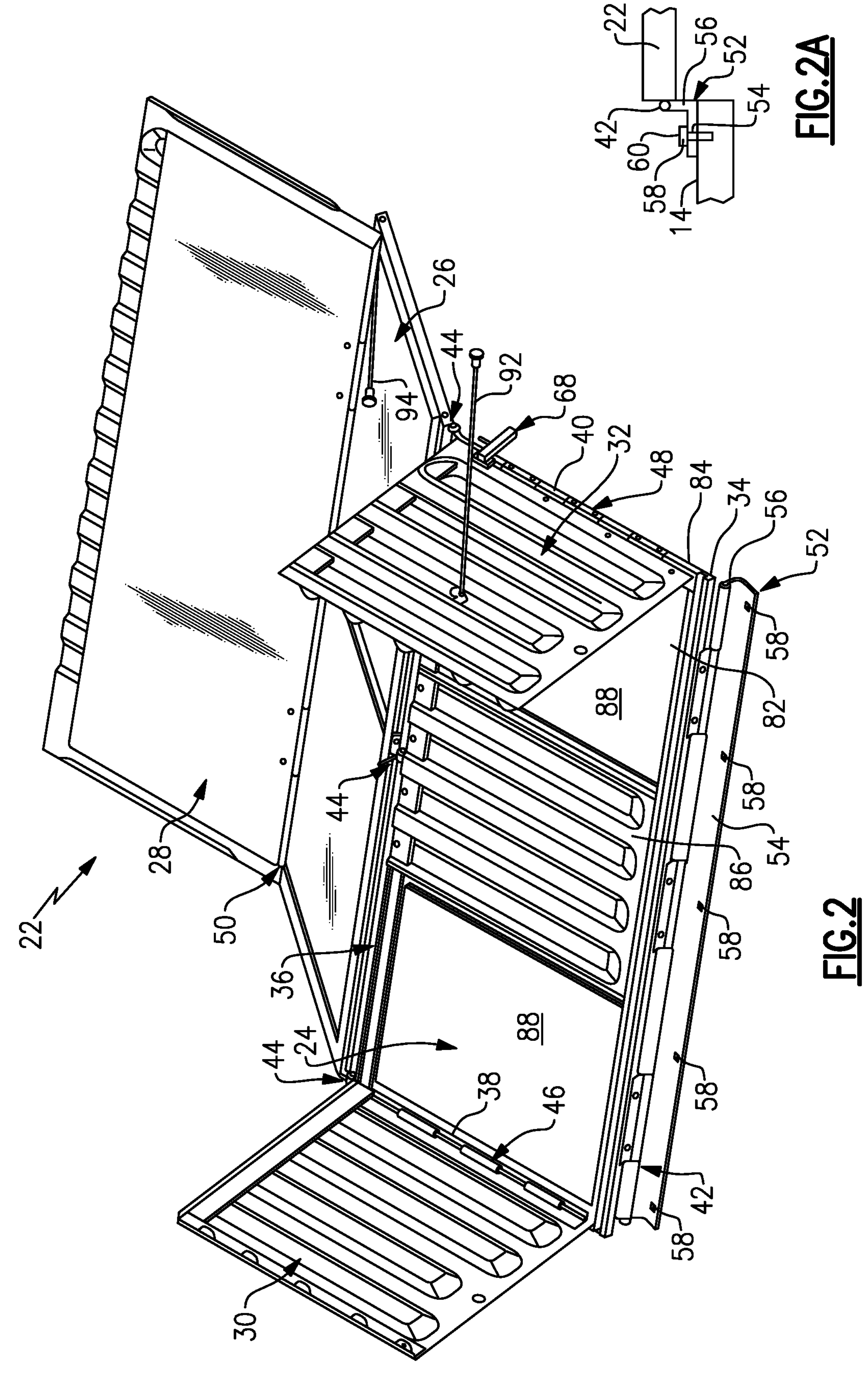
FIG. 2 illustrates a perspective view of the cargo bed extender system comprised of a plurality of panels which are each shown in an unfolded state.
FIG. 2A illustrates a schematic side view of a mounting interface between the cargo bed extender system and a vehicle floor.

In one example shown in FIG. 2, the plurality of panels comprises at least a box bottom panel 24 that is mounted for pivotal movement relative to the cargo bed floor 14, a box rear panel 26 that is mounted for pivotal movement relative to the box bottom panel 24, a box top panel 28 that is mounted for pivotal movement relative to the box rear panel 26, a first side panel 30 that is mounted for pivotal movement relative to the box bottom panel 24, and a second side panel 32 that is mounted for pivotal movement relative to the box bottom panel 24. In one example, the plurality of panels are pivotally coupled to each other such that the panels are selectively moveable independently of each other to provide each of the use positions.

As shown in FIG. 2, the box bottom panel 24 comprises a first lateral edge 34 configured to extend along a width of a distal edge of the cargo bed floor 14, a second lateral edge 36 opposite the first lateral edge 34, a first longitudinal edge 38 connecting the first lateral edge 34 to the second lateral edge 36 along one side of the box bottom panel 24, and a second longitudinal edge 40 connecting the first lateral edge 34 to the second lateral edge 36 along an opposite side of the box bottom panel 24. The plurality of panels are coupled to each other and/or to the box bottom panel 24 with pivots and/or hinges such that the panels can be folded and unfolded relative to the box bottom panel 24. In one example the cargo bed extender system 22 includes the following hinge configuration: a primary hinge assembly 42 pivotally couples the first lateral edge 34 of the box bottom panel 24 to the cargo bed floor 14; at least one second hinge 44 pivotally couples the second lateral edge 36 of the box bottom panel 24 to the box rear panel 26; at least one third hinge 46 pivotally couples the first longitudinal edge 38 of the box bottom panel 24 to the first side panel 30; at least one fourth hinge 48 pivotally couples the second longitudinal edge 40 of the box bottom panel 24 to the second side panel 32; and a secondary hinge assembly 50 pivotally couples the box top panel 28 to the box rear panel 26. In one example, the at least one second hinge 44 comprises a 270 degree hinge. In one example, at least three second 270 degree hinges 44 are used as shown in FIG. 2.

In one example, the primary hinge assembly 42, the at least one second hinge 44, the at least one third hinge 46, the at least one fourth hinge 48, and the secondary hinge assembly 50 all operate independently of each other. In other words, each hinge can be selectively actuated independently of all of the other hinges.

In one example, the cargo bed extender system 22 includes at least one mounting bracket 52 that includes at least a first flange 54 to fix the bottom box panel 24 to the cargo bed floor 14 and a second flange 56 that includes the primary hinge assembly 42 that is coupled to the box bottom panel 24 such that the plurality of panels can pivot relative to the cargo bed floor 14 as a single unit when moving to the stowed position. In one example, the bracket 52 comprises an L-shaped bracket where the first 54 and second 56 flanges are perpendicular to each other (see FIG. 2A). In one example, the first flange 54 extends in the lateral direction and the second flange 56 extends upwardly from the first flange 54 in a vertical direction. This mounting configuration allows the cargo bed extender system 22 to be easily and efficiently mounted as a single unit to the cargo bed floor 14. In one example, the single unit is mounted in place using a plurality of fasteners 60 that extend through holes 58 in the first flange 54 to connect to the floor structure. In one example, only five fasteners need to be used to secure the unit in place.

Figure 3:
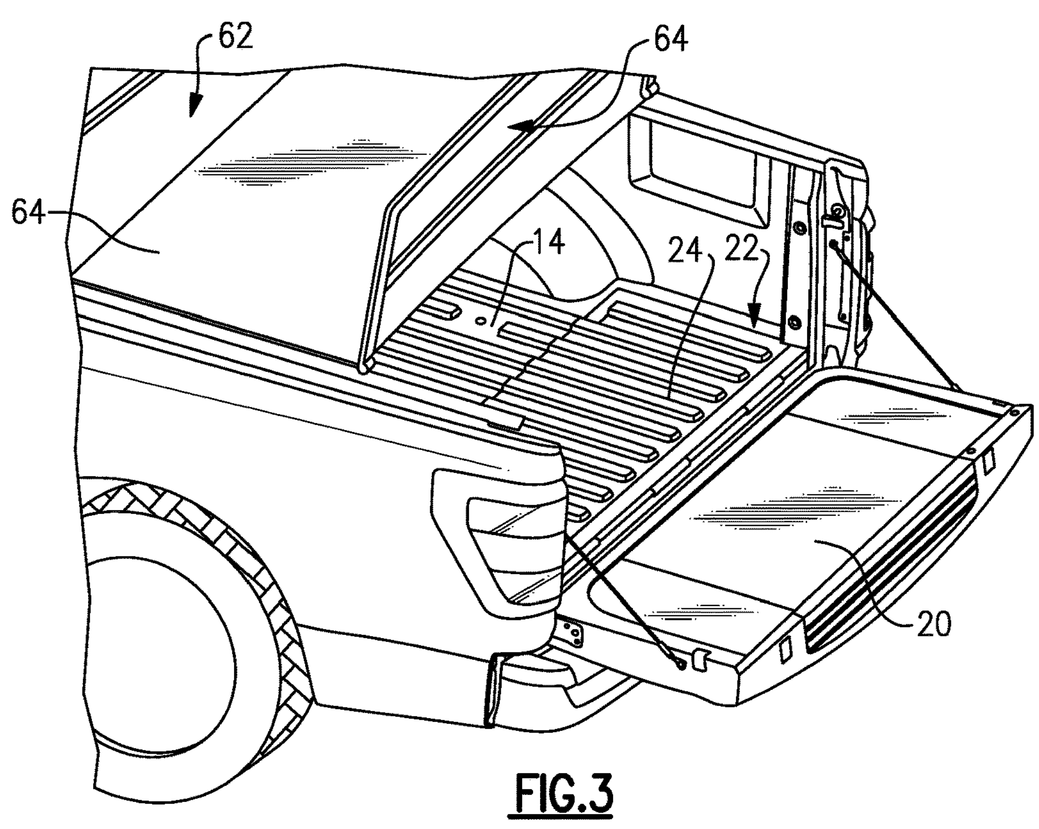
FIG. 3 illustrates a perspective view of the cargo bed extender system in the stowed position with a tonneau cover panel in an open position.

In one example, a tonneau cover 62 is used to enclose the cargo area of an open bed truck. The tonneau cover 62 comprises a hard or soft cover that spans the back of a pickup truck bed 12 to protect the load or to provide more aerodynamic flow. In one example, the tonneau cover 62 is comprised of one or more cover panels 64 that can be flipped or pivoted in sections to provide access to the cargo area as shown in FIG. 3. When in each of the various use positions described below, the vehicle may or may not include the tonneau cover 62.

Figure 4:
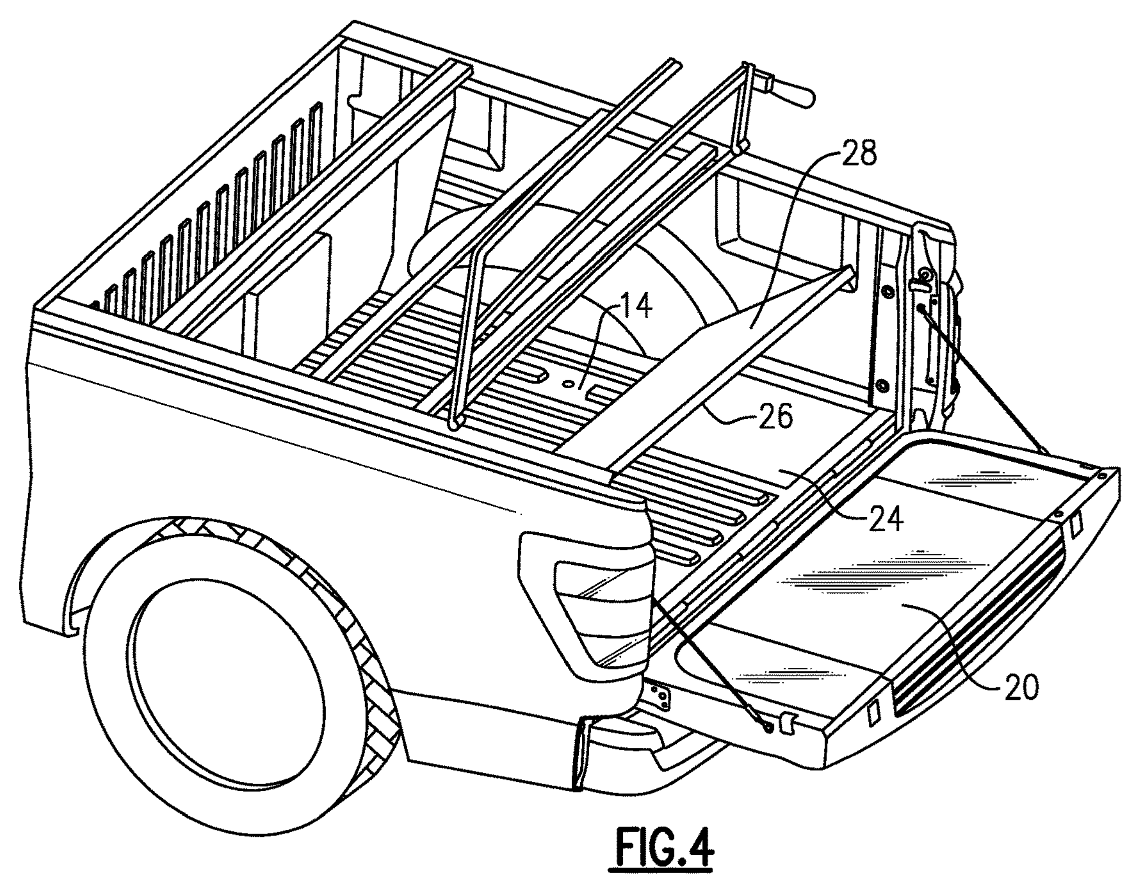
FIG. 4 illustrates a perspective view of the cargo bed extender system moving to a cargo divider wall position.
Figure 5:
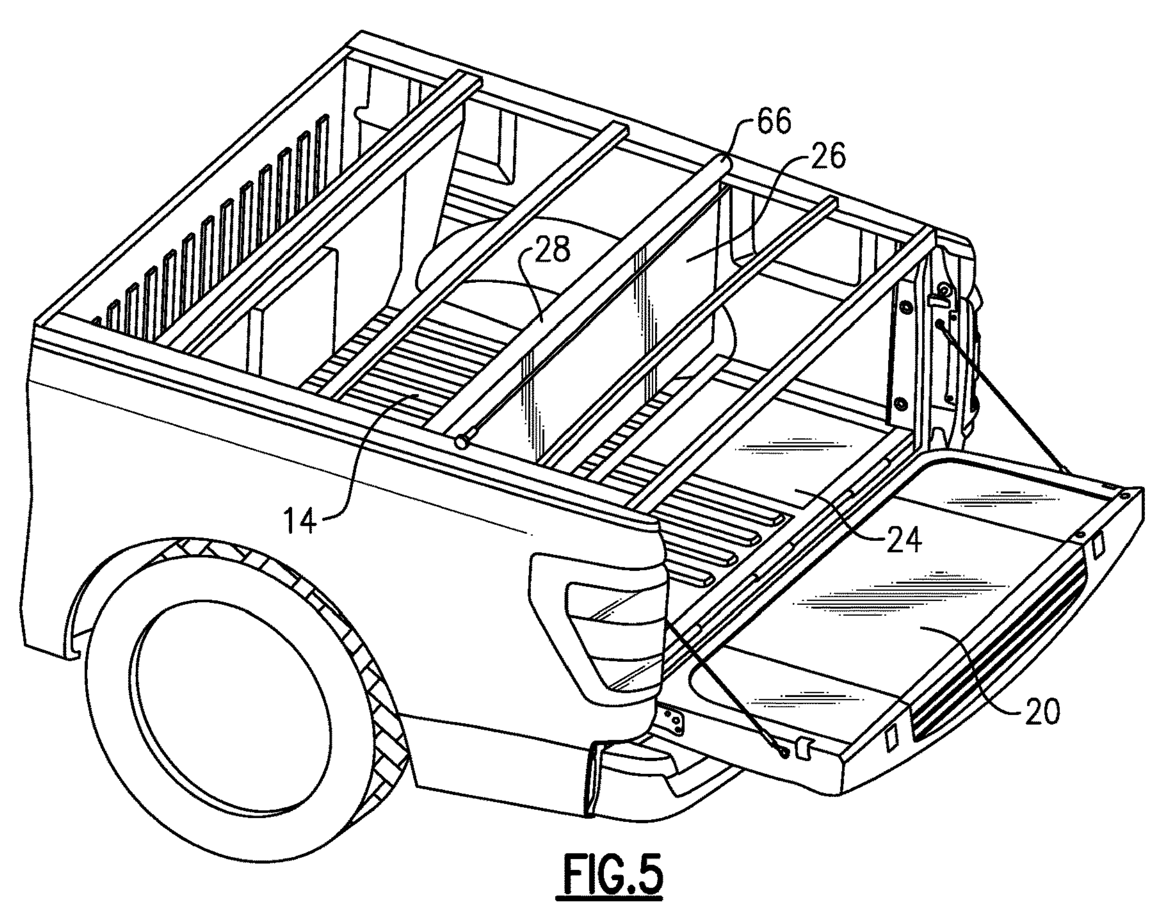
FIG. 5 illustrates a perspective view of the cargo bed extender system in the cargo divider wall position.

As discussed above, when the plurality of panels are in the stowed position, the box top panel 28 is generally flush with the cargo bed floor 14 as shown in FIG. 3. In order to provide a cargo divider use configuration within the cargo bed area, the box rear panel 26 and box top panel 28 are rotated together as a unit away from the box bottom panel 24 (see FIG. 4) to an upright position as shown in FIG. 5. In this position, the box rear panel 26 and box top panel 28 are overlapping with each other to comprise a cargo divider wall 66 that extends in a vertical position, e.g. is perpendicular, relative to the box bottom panel 24 which remains parallel with the floor 14. The cargo divider wall 66 extends across the entire width of the cargo area to separate the cargo area into discrete sections. The tailgate 20 can be lowered, as shown in FIG. 5, to allow rear cargo loading. Or, if the tailgate 20 is raised, top cargo loading can be utilized. If a tonneau cover 62 is used and the tailgate 20 is raised, one or more cover panels 64 can be flipped open to allow top loading of cargo.

Figure 6:
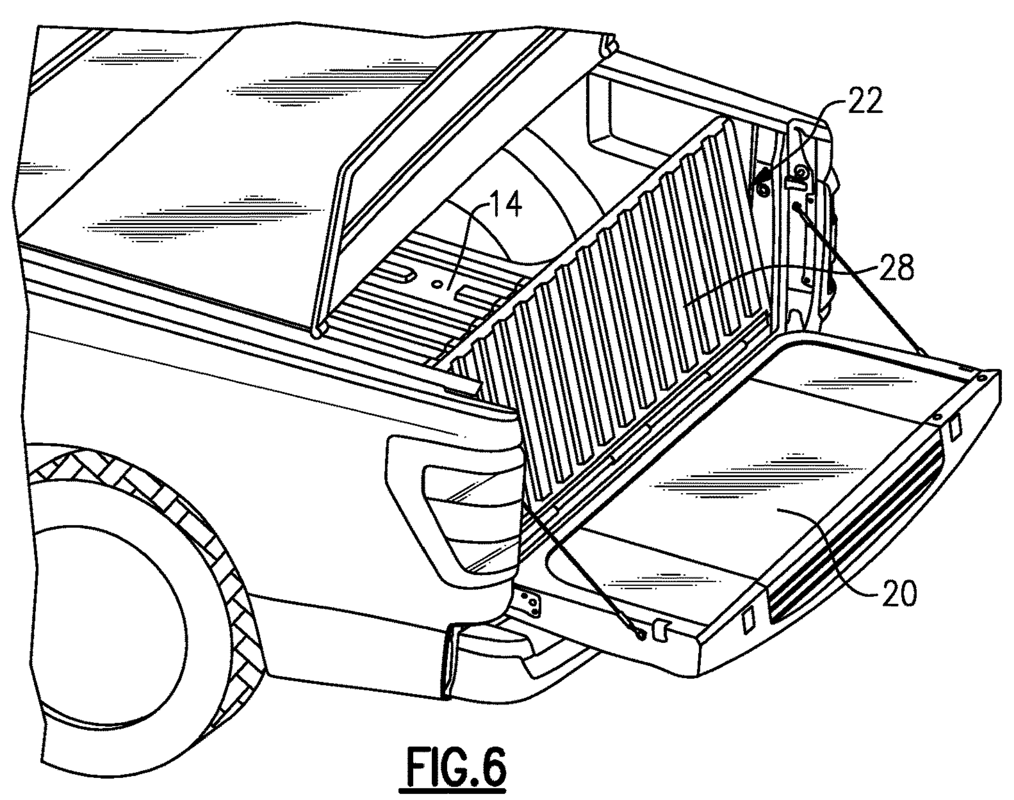
FIG. 6 illustrates a perspective view of the cargo bed extender system moving to an aero wing position.
Figure 7:
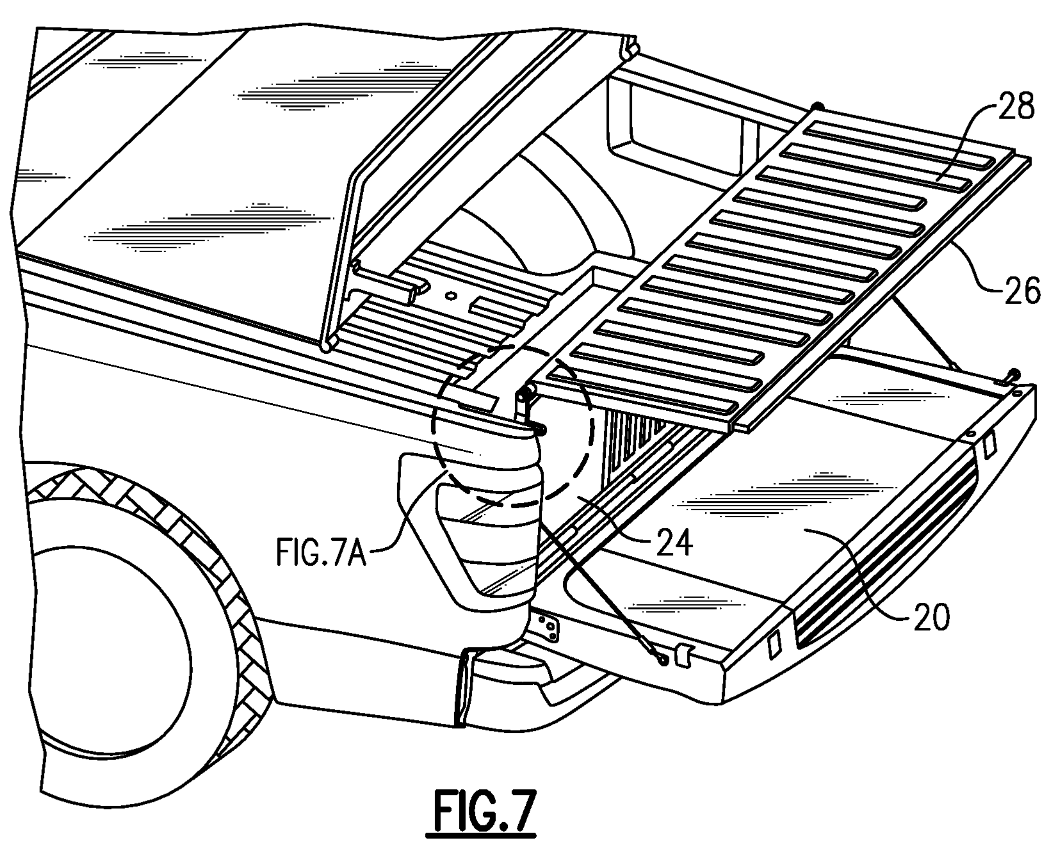
FIG. 7 illustrates a perspective view of the cargo bed extender system in the aero wing position.

The box rear panel 26 and box top panel 28 can also be used to provide an aero wing use configuration, where the cargo bed extender system 22 is rotated as a single unit from the stowed position (see FIG. 6) to an upright vertical position as shown in FIG. 7. The box rear panel 26 and box top panel 28 can subsequently be rotated as a unit to a horizontal position relative to the box bottom panel 24 which remains in the upright vertical position. As such, in this configuration, the box rear panel 26 and box top panel 28 are spaced apart and parallel to the floor, and the box bottom panel 24 is perpendicular to the floor. The box bottom panel 24 is also perpendicular to the box rear panel 26 and box top panel 28 to form an L-shape.

Figure 7A:
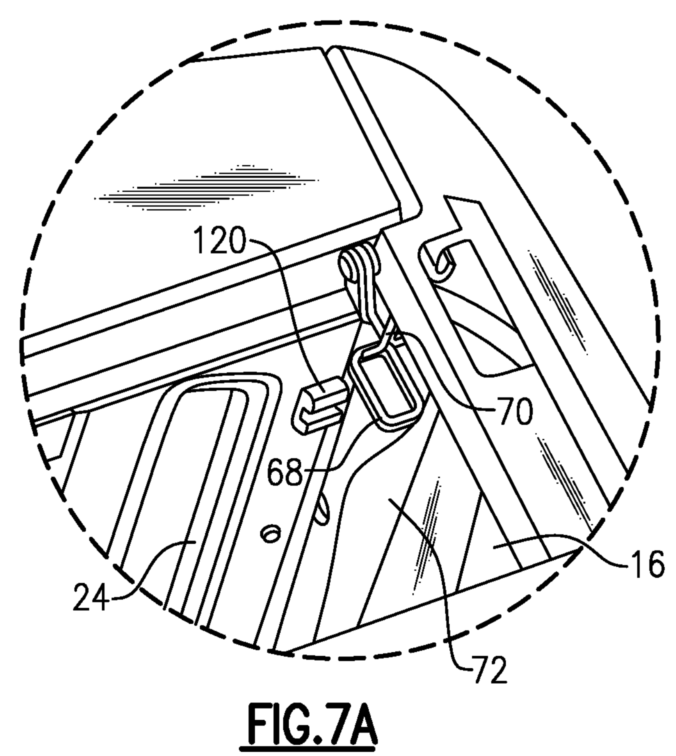
FIG. 7A is a magnified view of a box bottom panel of the cargo bed extender system latched to a D-pillar when in the aero wing position.

In one example, the cargo bed extender system 22 includes a striker loop latch 68 (FIG. 7A) that is fixed to and edge of the box bottom panel 24. When the box bottom panel 24 is moved to the vertical, upright position, the striker loop latch 68 latches to a latching member 70 that is associated with a D-pillar 72 on one of the side walls 16. Once latched, the box bottom panel 24 is held fixed in the upright position.

Figure 8:
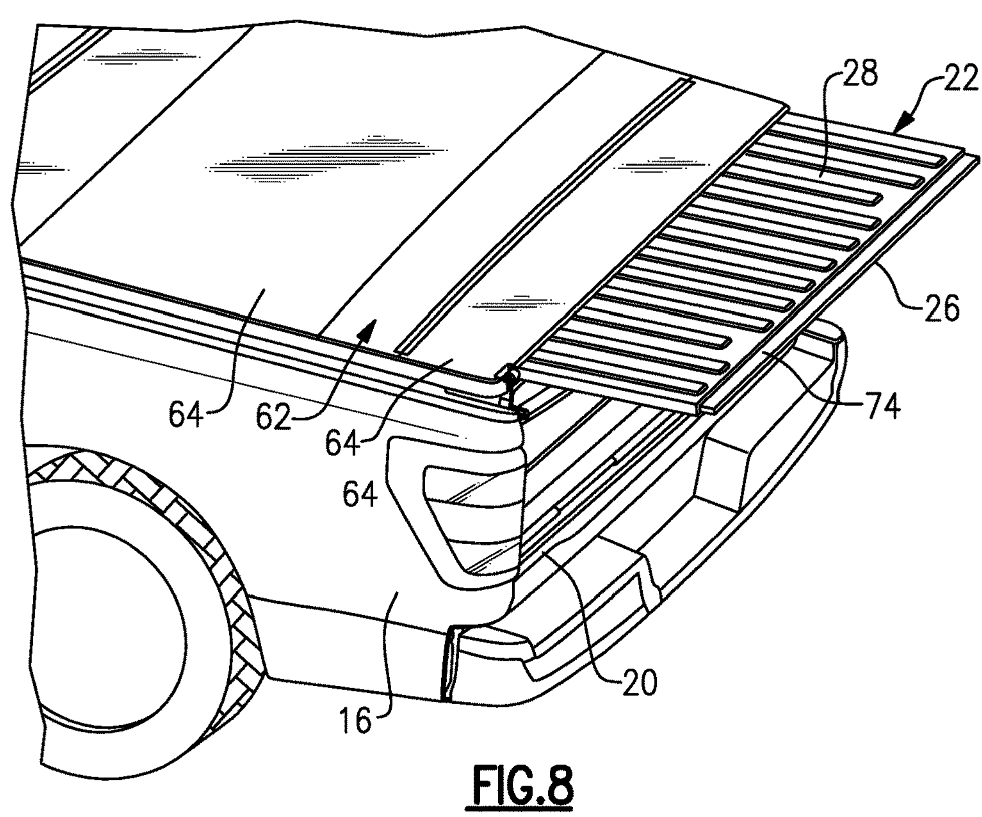
FIG. 8 illustrates a perspective view of the cargo bed extender system in the aero wing position with the tailgate closed and the tonneau cover closed.

In one example, to complete the aero wing use configuration, the tailgate 20 is moved to the closed position such that the box rear panel 26 and box top panel 28 rest on a top edge of the tailgate 20 to form an aero wing 74 as shown in FIG. 8. The cover panels 64 of the tonneau cover 62 are closed to provide a smooth transition to the aero wing 74. The tailgate 20 retains the box rear panel 26 and box top panel 28 in the desired position and air flow pressure during driving holds the box rear panel 26 and box top panel 28 in place against the top edge of the tailgate 20.

Figure 9:
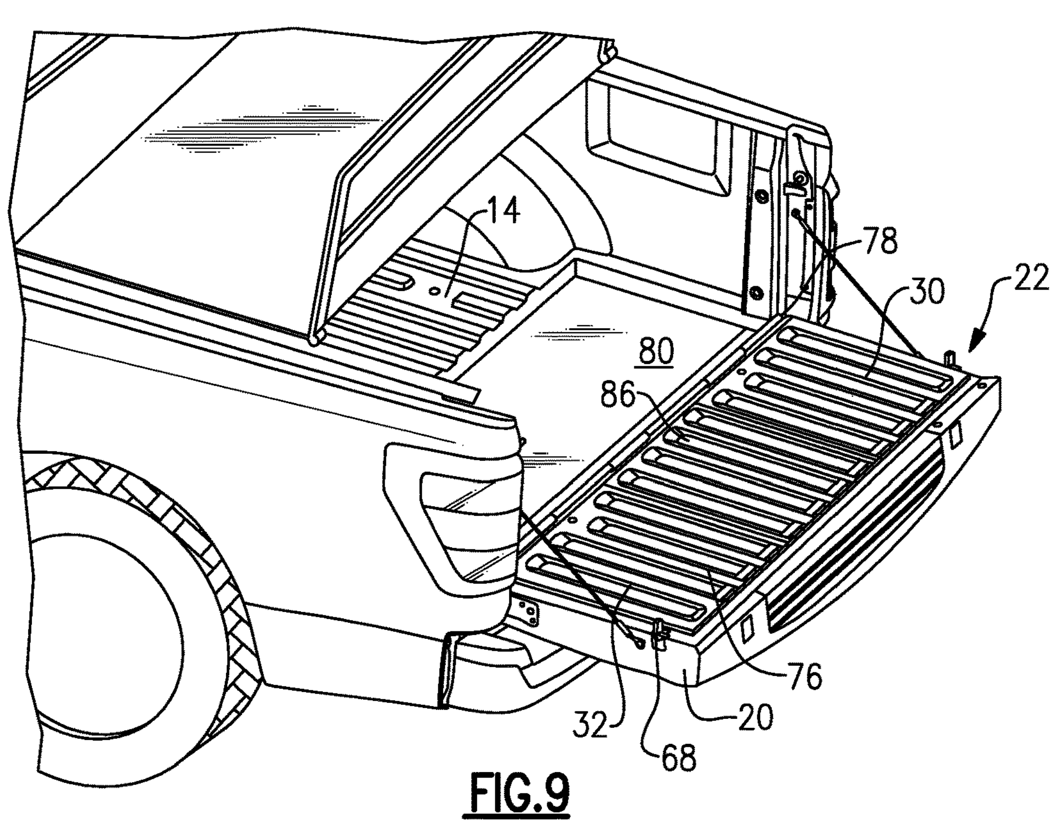
FIG. 9 illustrates a perspective view of the cargo bed extender system in the extended work surface position.

In one example, in order to provide an extended work surface, the cargo bed extender system 22 is rotated 180 degrees From a first horizontal orientation, within a cargo bed area when in the stowed position as shown in FIG. 3, to a second horizontal orientation that extends a work surface 76 beyond a distal edge 78 of the cargo bed area as shown in FIG. 9. The floor 14 of the cargo bed area includes a recessed area 80 (see FIGS. 9 and 23) that receives the cargo bed extender system 22 when in the stowed position. As shown in FIG. 2, the box bottom panel includes a first side 82 and a second side 84 facing opposite the first side 82. The first side 82 includes a fixed center panel portion 86 and two open area portions 88 that each receive one of the first 30 and second 32 side panels when the side panels 30, 32 are in the folded position. When in the stowed position, the first side 82 of the box bottom panel 24 faces downwardly into the recessed area 80 and the second side 84 faces upwardly. When in the extended work surface position, the first side 82 faces upwardly and the second side 84 faces downwardly at an inner surface of the open tailgate 20 as shown in FIG. 9. When in this use position, the first and second side panels 30, 32 and the center panel portion 86 are aligned with each other to provide the work surface 76. In one example, the work surface 76 is secured to the tailgate 20 through the striker loop latch 68. This will be discussed in greater detail below.

In one example, the panels 30, 32, 86 can comprise tool attachment panels that can be ordered to fit user specific requirements. In one example, the tools can be stowed away within the work surface with the side panels being flipped to the closed position.

Figure 10:
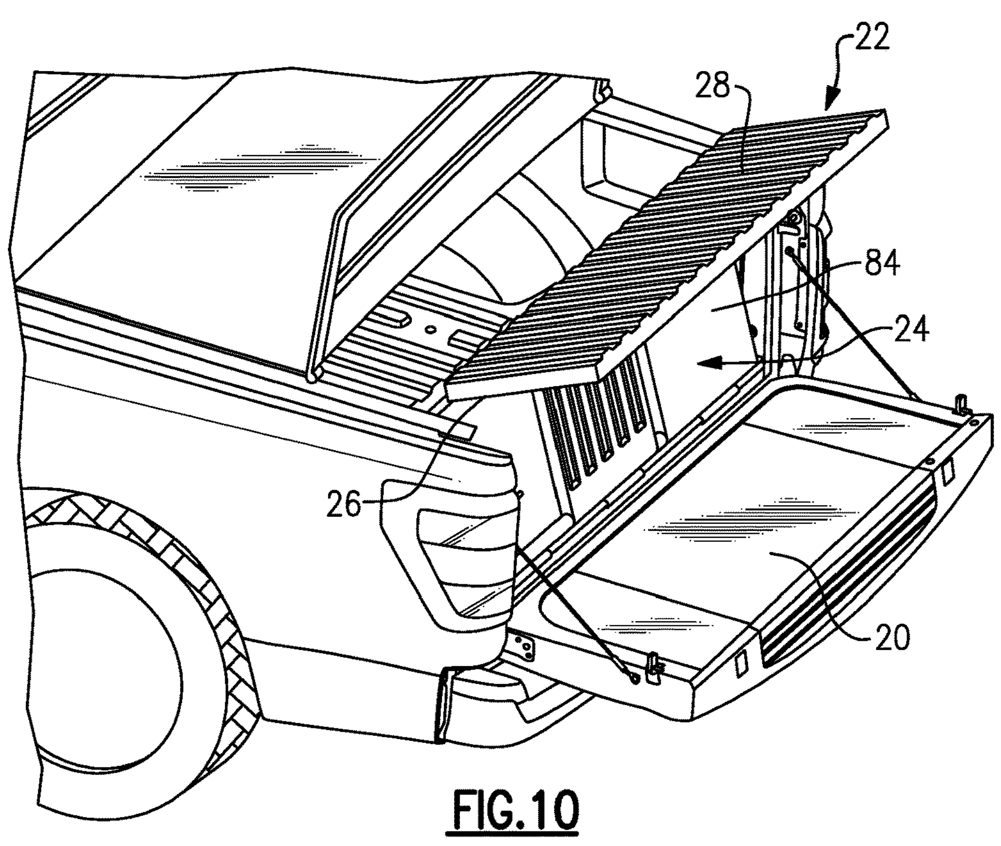
FIG. 10 illustrates a perspective view of the cargo bed extender system moving to a further extended work surface position.
Figure 11:
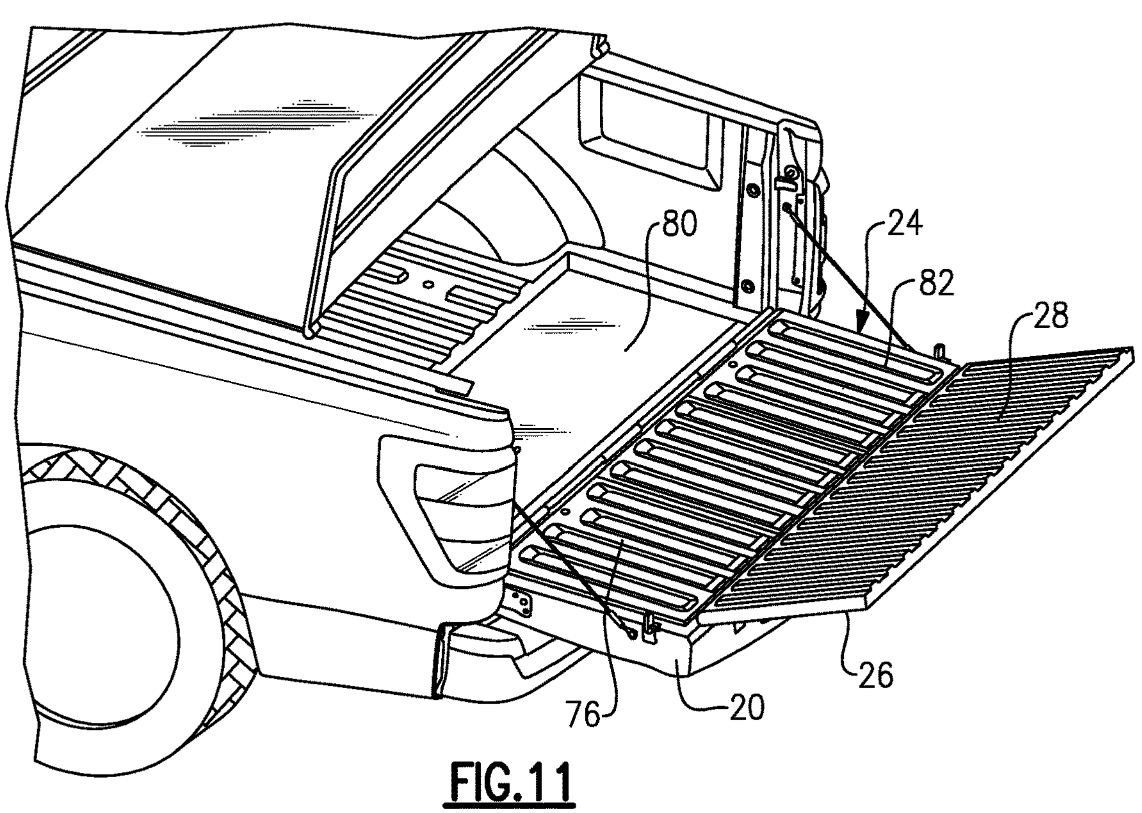
FIG. 11 illustrates a perspective view of the cargo bed extender system moving to the further extended work surface position subsequent to the position shown in FIG. 10.
Figure 12:
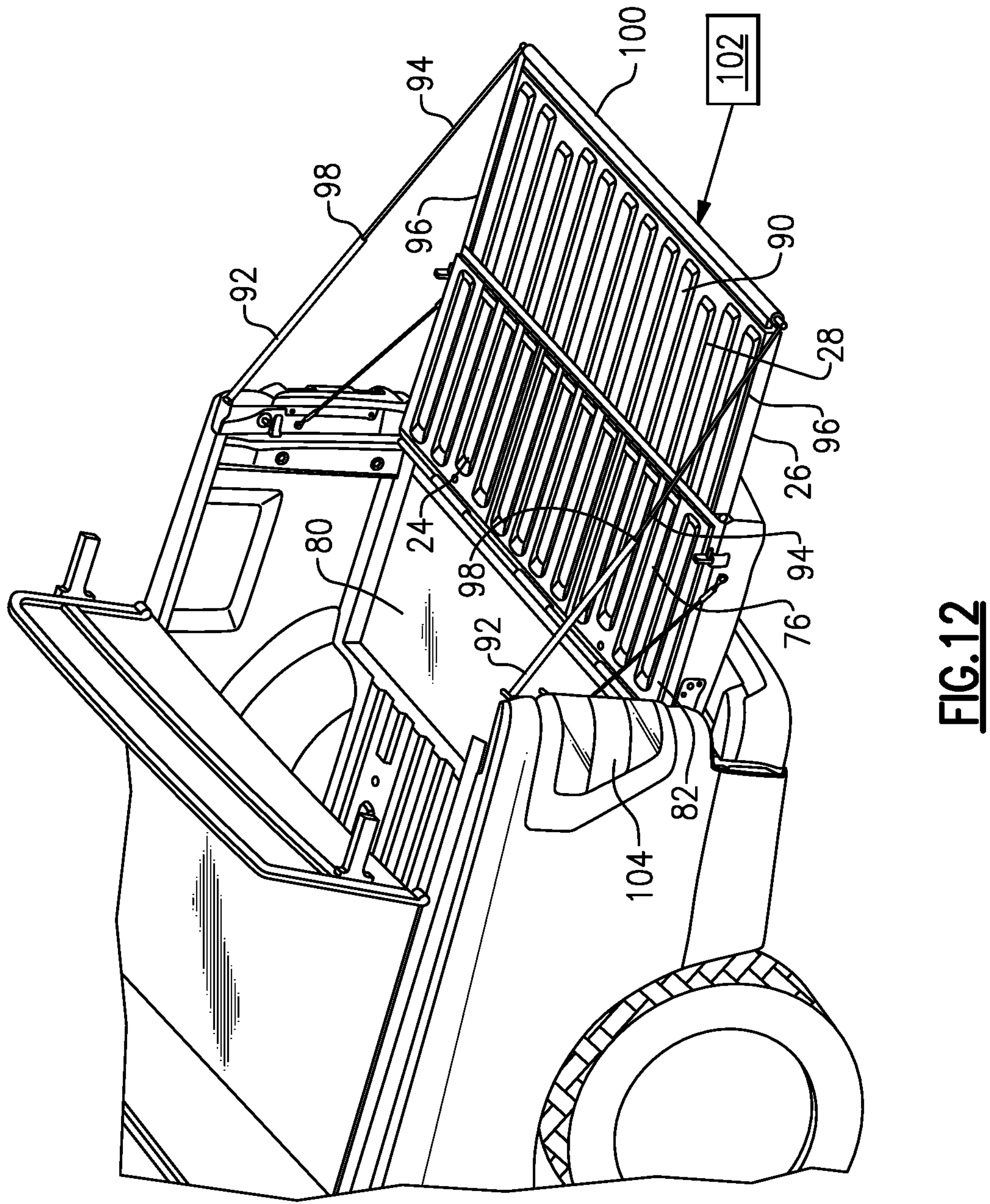
FIG. 12 illustrates a perspective view of the cargo bed extender system in the further extended work surface position.

In one example, in order to provide a further extended work surface use position, the cargo bed extender system 22 is rotated as a unit from the stowed position (FIG. 3) to an upright and substantially vertical position as shown in FIG. 10. The box rear panel 26 and box top panel 28 are subsequently rotated as a unit away from the box bottom panel 24 (FIG. 10) such that the box bottom panel 24 can then be rotated to a horizontal position to provide the work surface 76 as shown in FIG. 11. The unit of the box rear panel 26 and box top panel 28 can then be rotated to a horizontal position to provide the further extended work surface 90 that extends outwardly beyond the work surface 76 as shown in FIG. 12.

In one example, when in the further extended work surface use position, a first set of cables 92 and a second set of cables 94 are used to provide support for the extended work surface 90. The first set of cables 92 are associated with the side walls 16 of the truck bed. The second set of cables 94 are associated with the cargo bed extender system 22. In one example, the second set of cables 94 comprises a pair of cables 94 that are mounted to the box rear panel 26. In one example, each cable 94 stowed within a respective side edge 96 of frame member associated with the box rear panel 26. The side edges 96 can include recessed areas to store the cables 94. When in the further extended work surface use position, the first cables 92 are coupled to the second cables 94 at a connection 98. This holds the work surface 90 in a secure horizontal position while also providing increased support for the extended work surface 90.

In one example, a top edge of the unit of the box rear panel 26 and box top panel 28 includes one or more integrated light strips 100. In one example, any time the unit of the box rear panel 26 and the box top panel 28 flips to the further extended work surface use position, a sensor 102 activates the integrated light strips 100 which are configured to mimic vehicle tail lights 104.

Figure 13:
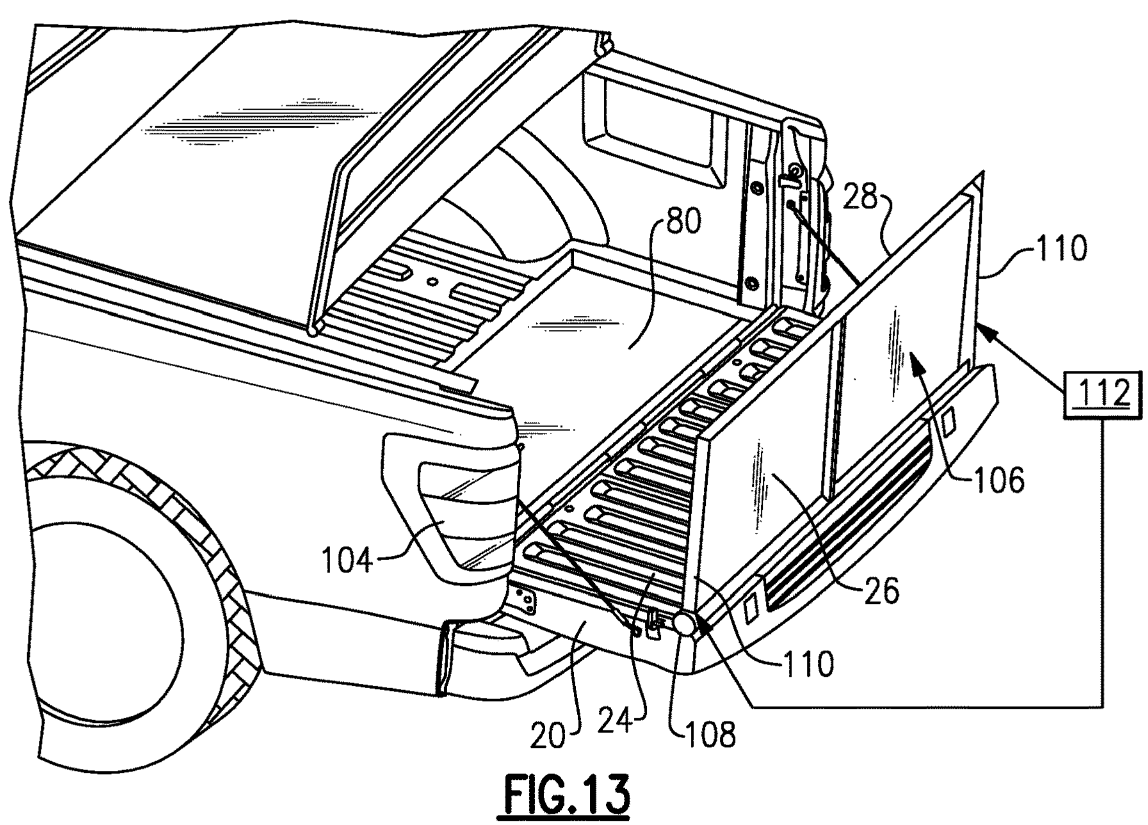
FIG. 13 illustrates a perspective view of the cargo bed extender system in a load stop position.

In one example, in order to provide a load stop use position, the cargo bed extender system 22 is rotated as a unit from the stowed position to an upright vertical position with the box rear panel 26 and box top panel 28 being subsequently rotated as a unit away from the box bottom panel 24 as shown in FIG. 10. The box bottom panel 24 is then rotated to a horizontal position to provide an extended cargo bed area as shown in FIG. 11. The unit of the box rear panel 26 and the box top panel 28 is then rotated to a vertical position to provide a load stop 106 at a distal end 108 of the extended cargo bed area as shown in FIG. 13. In this position, the box rear panel 26 and box top panel 28 are perpendicular to the box bottom panel 24. In one example, the 270 degree hinges 44 are utilized to flip the box rear panel 26 to the vertical, upright position.

In one example, side edges of the unit of the box rear panel 26 and box top panel 28 include one or more integrated light strips 110. In one example, any time the unit of the box rear panel 26 and the box top panel 28 flips to the load stop use position, a sensor 112 activates the integrated light strips 110 which are configured to mimic vehicle tail lights 104.

Figure 14:
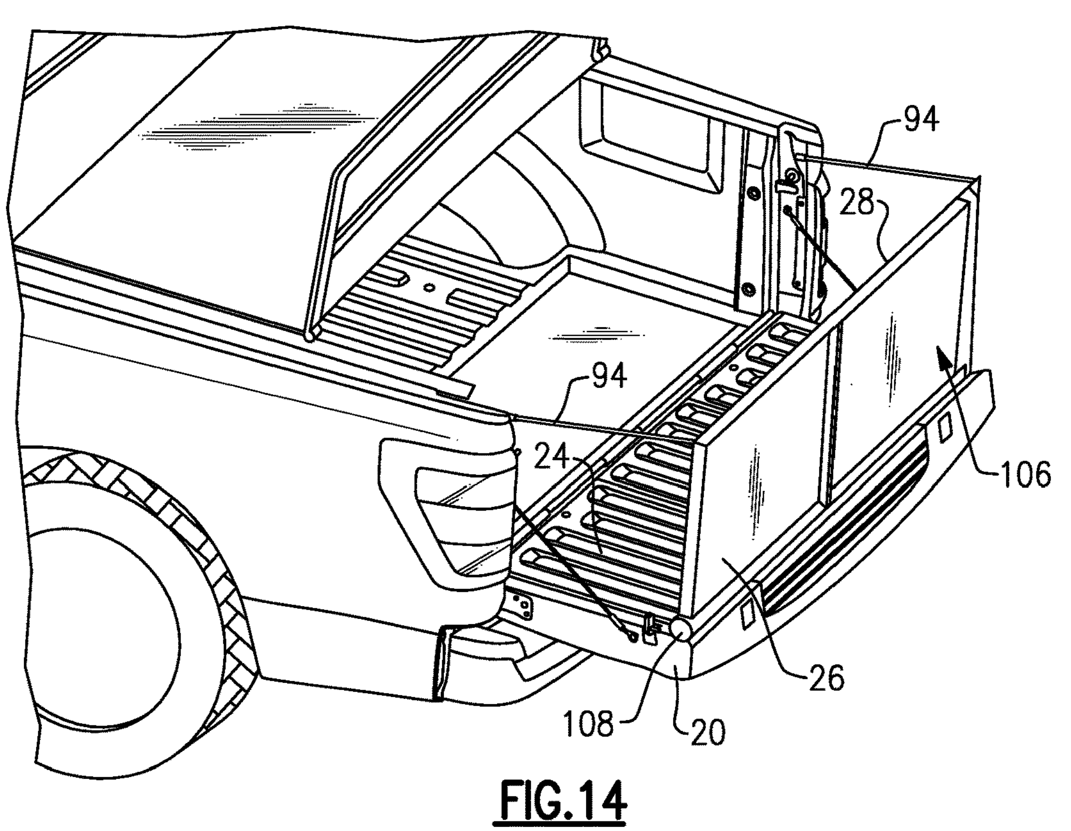
FIG. 14 illustrates a perspective view of the cargo bed extender system in the load stop position with load stop cables in an attached position.

In one example, the second set of cables 92 is deployed to hold the unit of the box rear panel 26 and box top panel 28 in the load stop position as shown in FIG. 14. As discussed above, the cables 94 are stored within side edges of the box rear panel 26 until needed. One end of the cables 94 is fixed to the box rear panel 26 and the opposite end of the cables is selectively hooked or coupled to the side walls 16 of the truck bed.

Figure 15:
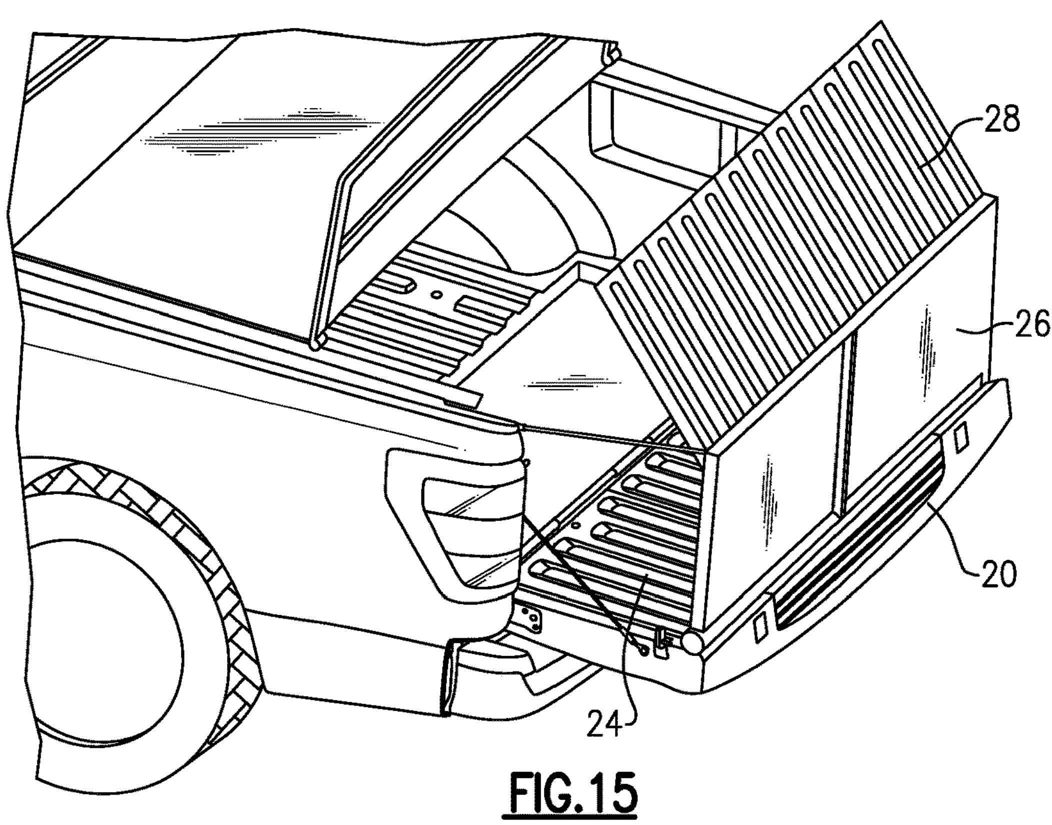
FIG. 15 illustrates a perspective view of the cargo bed extender system moving a box top panel from the load stop position to a sealed bed extender position.
Figure 16:
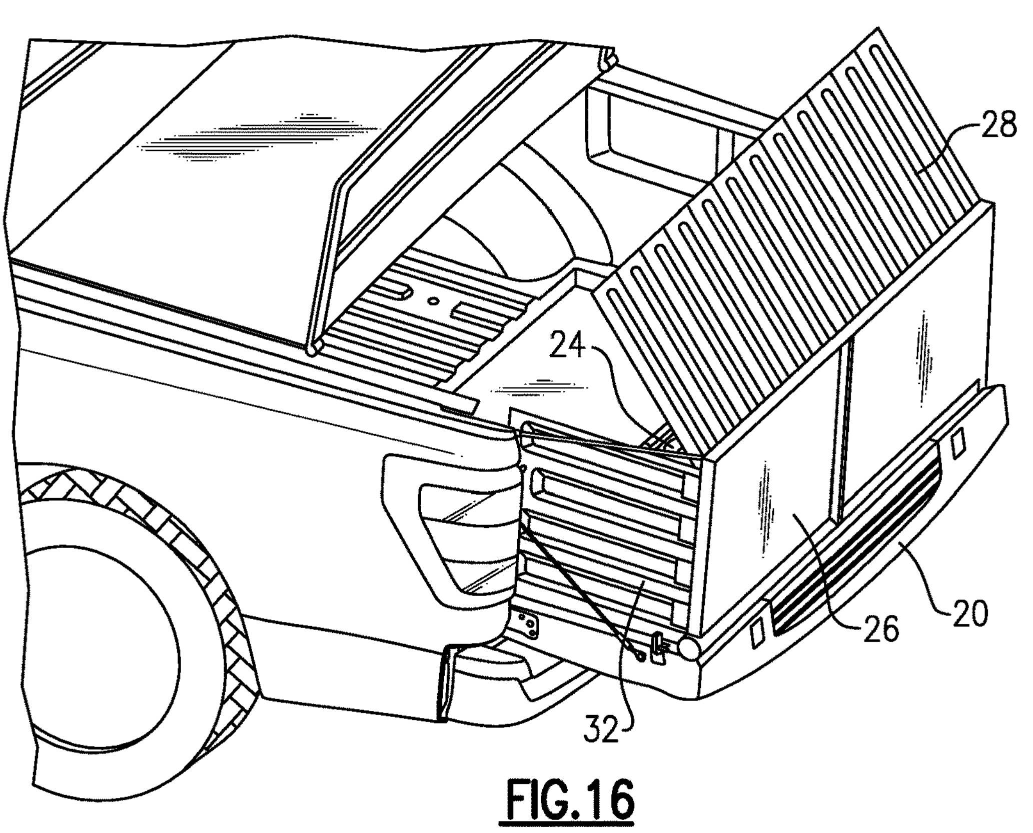
FIG. 16 illustrates a perspective view of the cargo bed extender system further moving to the sealed bed extender position by deploying side panels.
Figure 17:
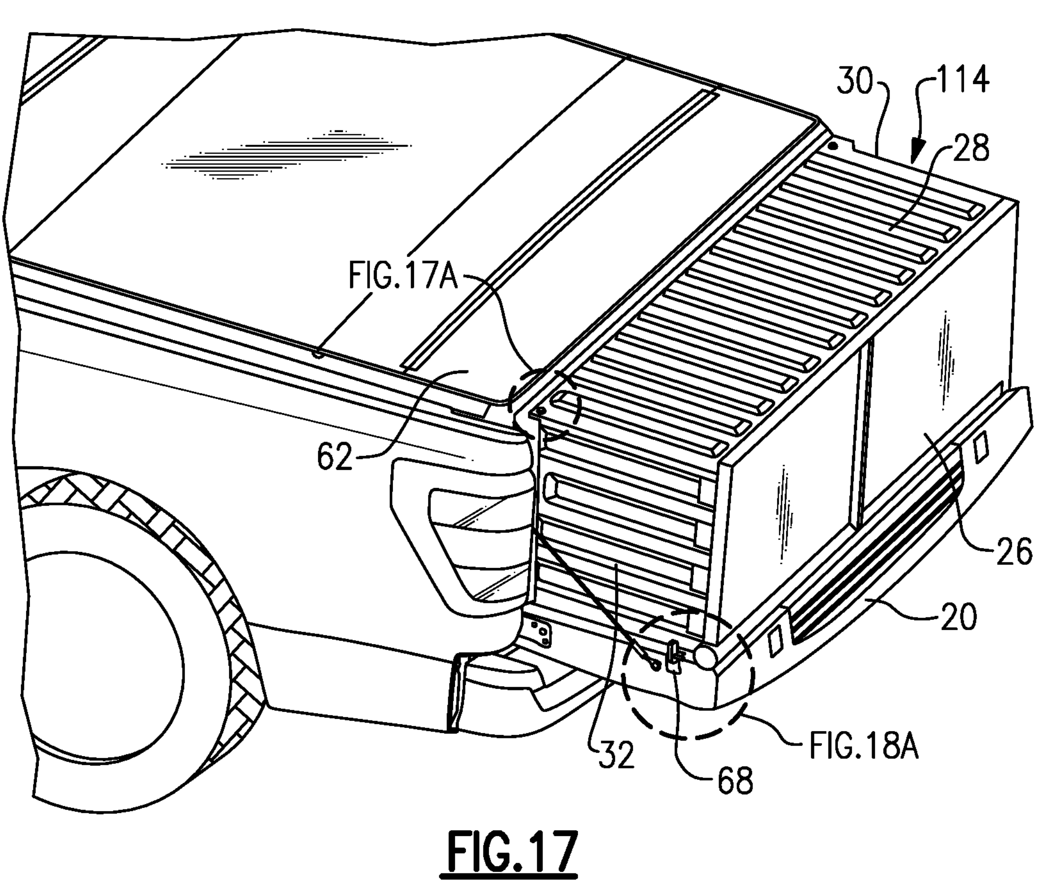
FIG. 17 illustrates a perspective view of the cargo bed extender system in the sealed bed extender position.

In one example, in order to provide a sealed enclosure use position, the cargo bed extender system 22 is first put into the load stop position shown in FIG. 13. The box top panel 26 is rotated upwardly away from the box rear panel 26 (FIG. 15) such that the first 30 and second 32 side panels can be rotated upwardly relative to the box bottom panel 24 to upright vertical positions as shown in FIG. 16. The box top panel 28 is then rotated downwardly to a position parallel with the box bottom panel 24, which provides a sealed enclosure 114 with only one open end that faces a cargo bed area. A completely sealed enclosure 114 can be provided when the tonneau cover 62 is moved to the closed position as shown in FIG. 17.

Figure 17A:
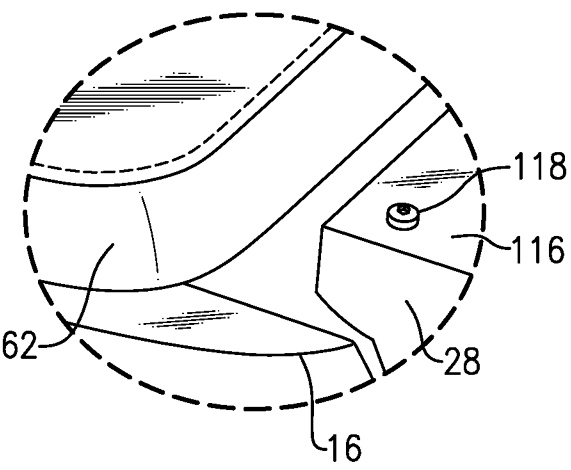
FIG. 17A is a magnified view of an attachment between the box top panel and side panels.

In one example, an upper facing edge 116 of the box top panel 28 includes one or more retainers 118 as shown in FIG. 17A. In one example, the retainers 118 are movable to secure the top panel 28 to the side panels 30, 32. In one example, the retainers 118 comprise lock cylinders, quarter-turn wing nuts, or other similar structures.

In one example, the first 30 and second 32 side panels include a retainer member 120 (FIG. 18A) that grips the striker loop latch 68 to secure the side panels in the upright position. In one example, the striker loop latch 68 comprises a first loop portion 122 and a second loop portion 124 having a shorter length than the first loop portion 122. The first 122 and second 124 loop portions are separated from each other by a center portion that includes a pivot shaft 126. The pivot shaft 126 pivotally couples the striker loop latch 68 to a side edge of the box bottom panel 24. This allows the striker loop latch 68 to rotate (see arrow 128) to reverse the positions of the first 122 and second 124 loop portions.

Figure 18A:
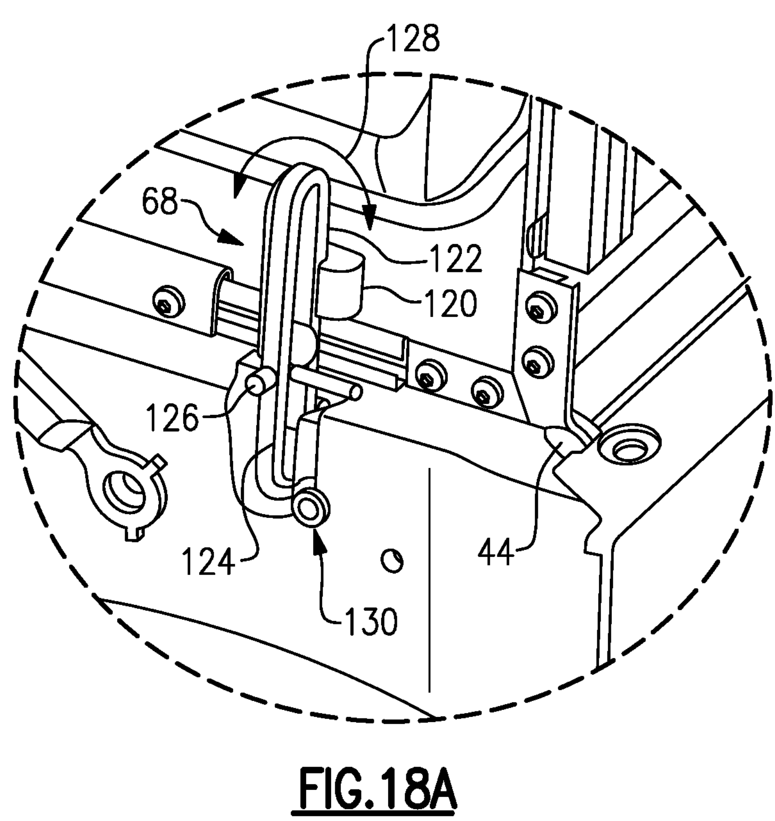
FIG. 18A is a magnified view of a striker loop latch being latched to the tailgate when the cargo bed extender system is in the position as shown in FIG. 17.

In the example shown in FIG. 18A, the cargo bed extender system 22 comprises sealed enclosure where the box bottom panel 24 overlaps the tailgate 20, the box rear panel 26 extends upwardly from the box bottom panel 24, the box top panel 28 extends over the box bottom panel 24, and the first 30 and second 32 side panels are in an upright position relative to the box bottom panel. In this configuration, the striker loop latch 68 is rotated such that the shorter, second loop portion 124 engages an existing power auto cinch latch 130 located within the tailgate 20 to retain the box bottom panel 24 fixed to the tailgate 20. The retainer member 120 of the side panels 30, 32 grips the longer, first loop portion 122 in a snap-fit connection. In one example, the retainer member comprises a C-shaped grip. To unlatch the box bottom panel 24 from the tailgate 20, the user would push a tailgate open button (not shown).

Figure 18B:
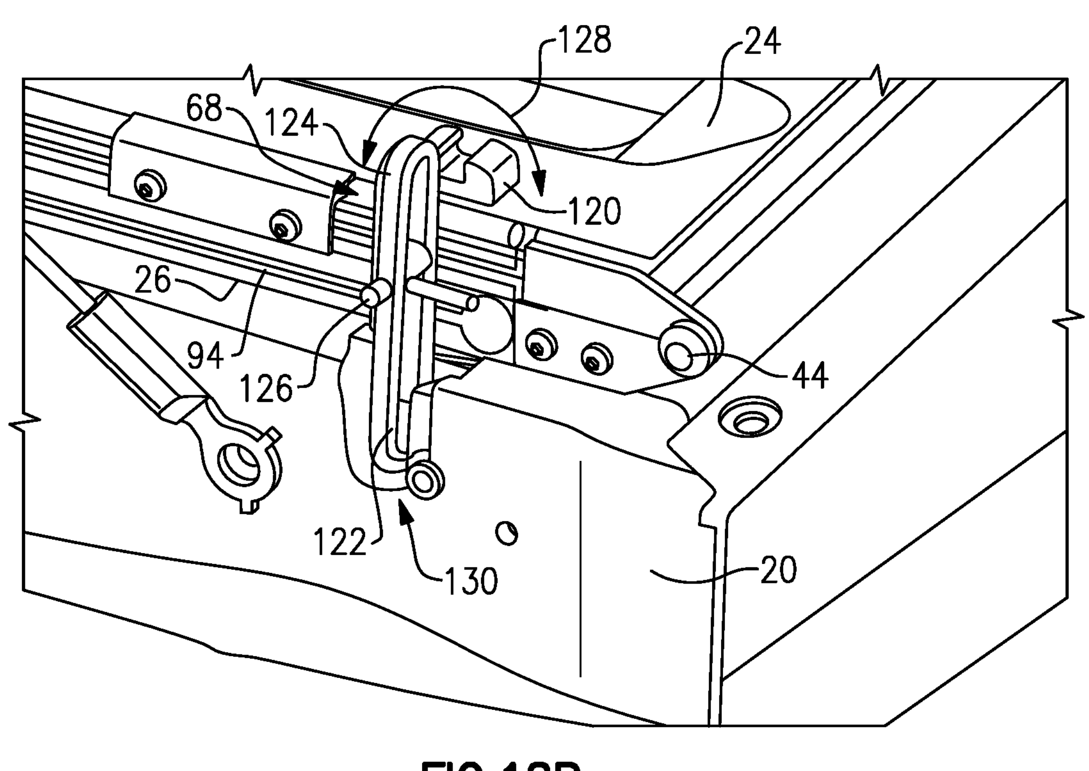
FIG. 18B is a magnified view of a striker loop latch being latched to the tailgate when the cargo bed extender system is in the position as shown in FIG. 9.

In the example shown in FIG. 18B, the cargo bed extender system 22 is in the extended work surface position as shown in FIG. 9. In this position the box bottom panel 24 faces upwardly with the box rear panel 26 and box top panel 28 being stacked underneath the box bottom panel 24. This increases the overall height of the cargo bed extender system 22 that is supported on the tailgate 20 as compared to that of FIG. 18A where only the box bottom panel is stacked directly on top of the tailgate 20. In the configuration of 18B, the striker loop latch 68 is rotated such that the longer, first loop portion 122 engages the existing power auto cinch latch 130 located within the tailgate 20 to retain the box bottom panel 24 fixed to the tailgate 20.

Figure 19:
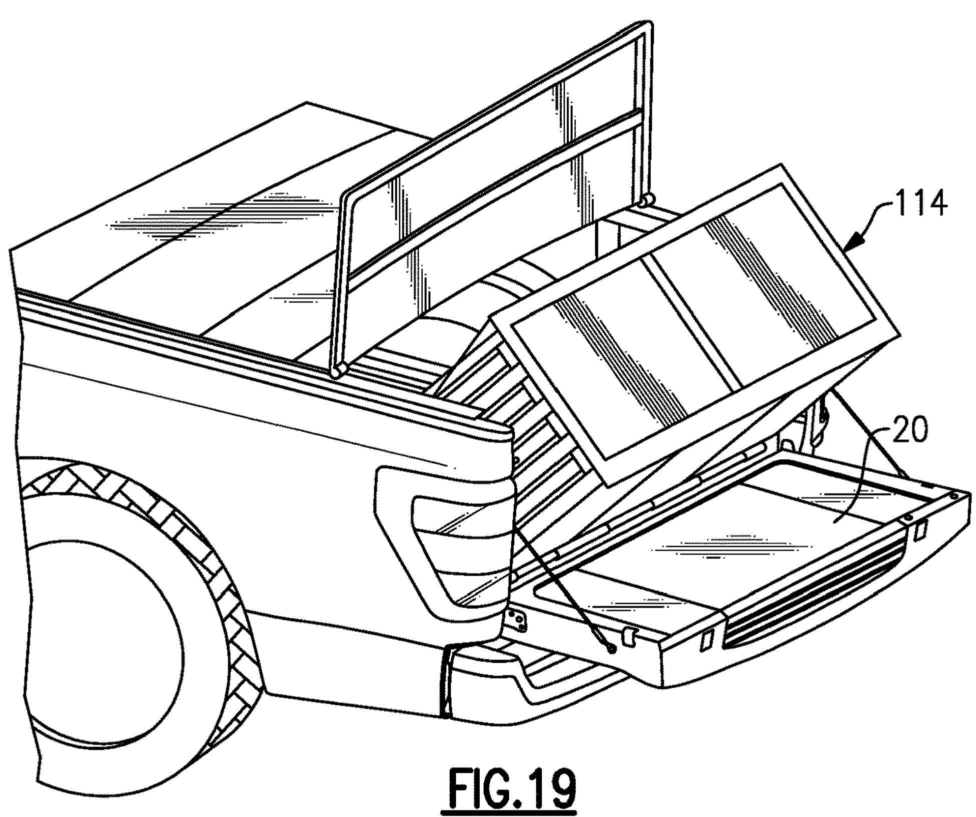
FIG. 19 illustrates a perspective view of the cargo bed extender system moving to a secured vault position.
Figure 20:
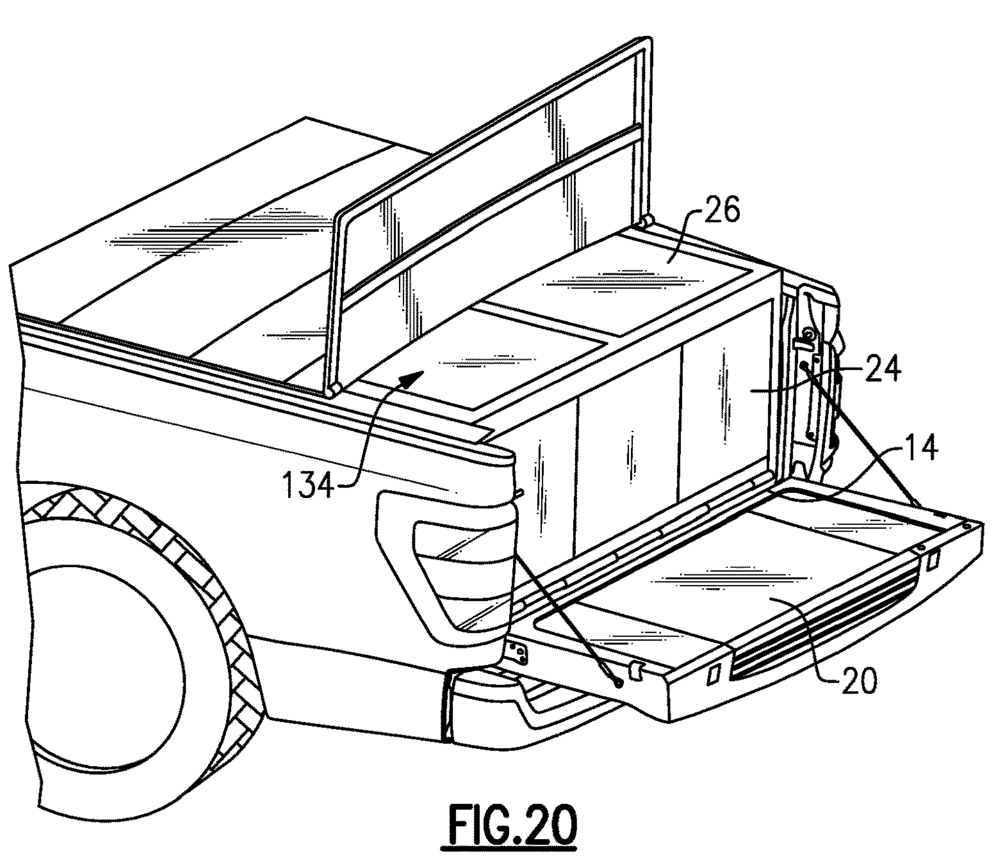
FIG. 20 illustrates a perspective view of the cargo bed extender system in the secured vault position.
Figure 21:
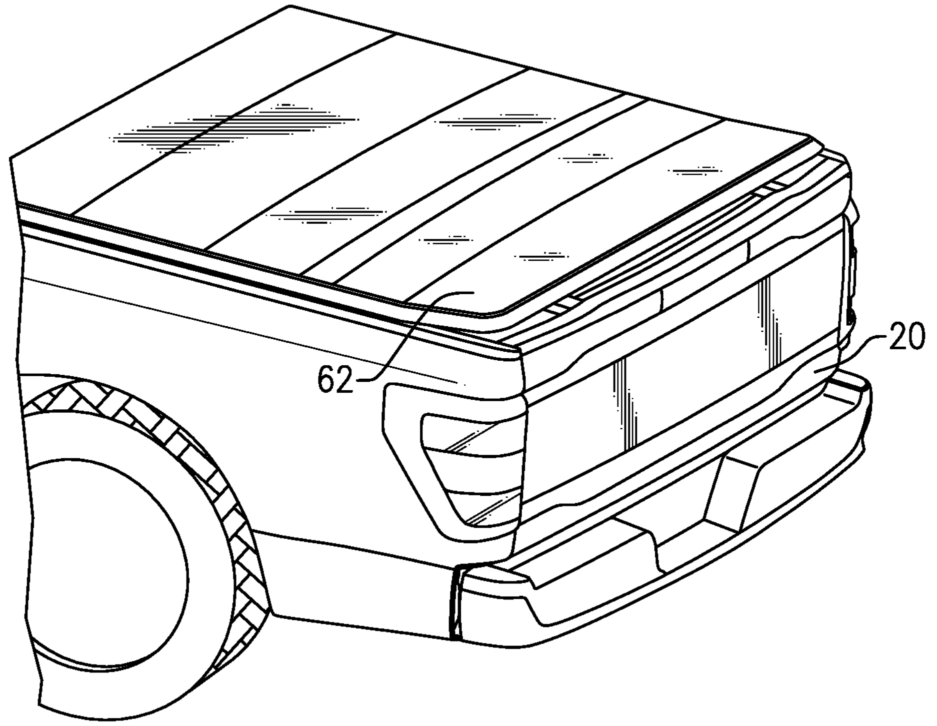
FIG. 21 illustrates a perspective view of the cargo bed extender system in the secured vault position with the tailgate closed and tonneau cover closed.

In one example, in order to provide a secured vault use position, the sealed enclosure 114 is unlatched from the tailgate 20. The sealed enclosure 114 is then rotated as a single unit (FIG. 19) into the cargo bed area such that the one open end is enclosed by the cargo bed floor 14 as shown in FIG. 20. In this position, the cargo bed extender system 22 comprises a secure vault 134 as there is no way to access anything stored within the vault 134. In one example, the vault 134 can be completely hidden from view by closing the tailgate 20 and extending the tonneau cover 62 over the vault 134 as shown in FIG. 21.

Figure 22:
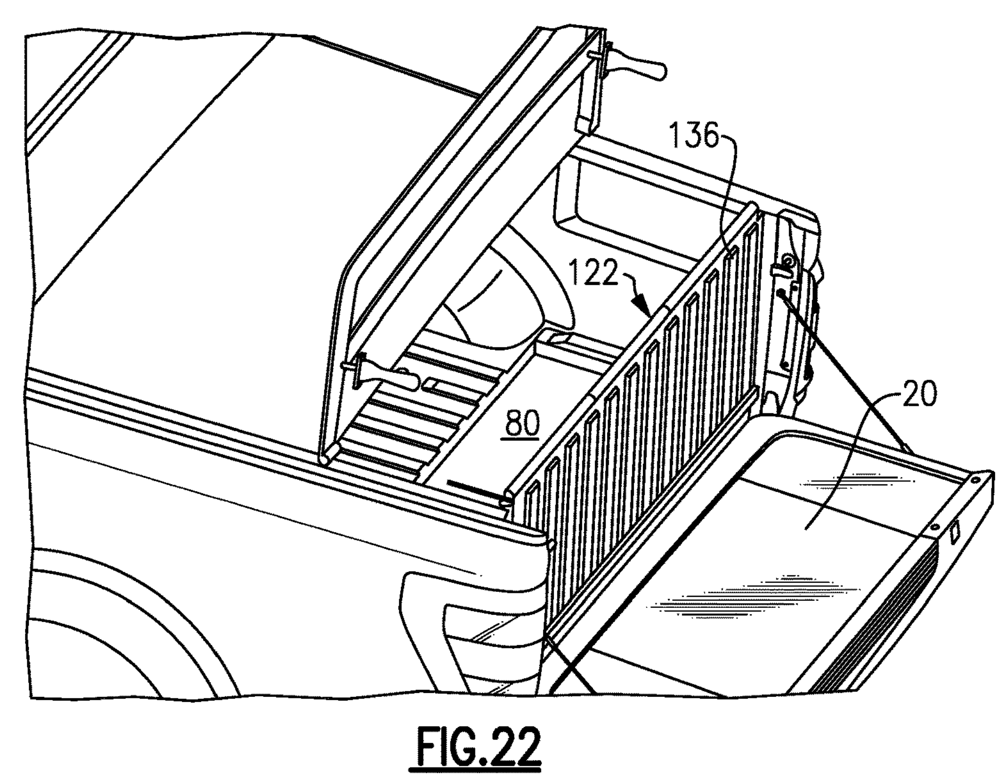
FIG. 22 illustrates a perspective view of the cargo bed extender system in a backrest position.
Figure 23:
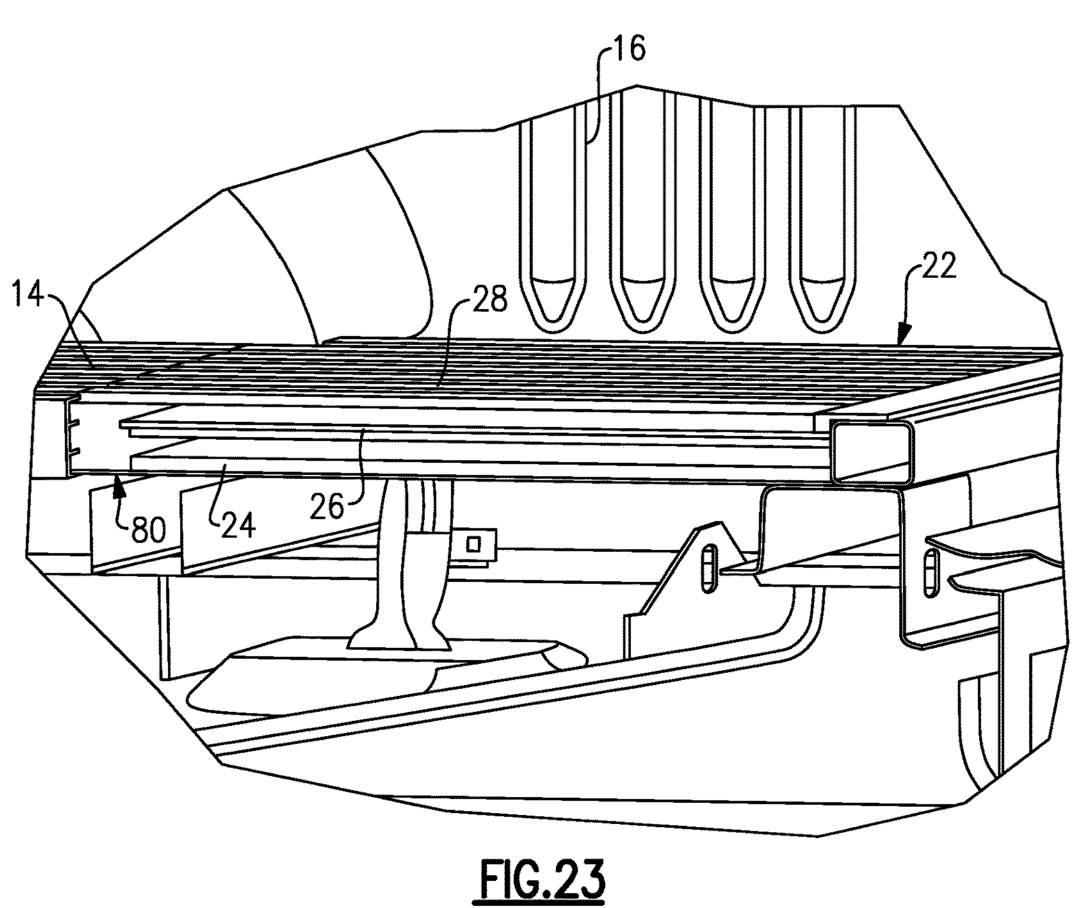
FIG. 23 is a magnified section view of the cargo bed extender system stowed in a recessed area of the cargo bed floor.

The cargo bed extender system 22 is also configurable into other use positions. In one example shown in FIG. 22, the tailgate 20 is lowered and the cargo bed extender system 22 is rotated to vertical position that is generally perpendicular to the tailgate 20 to provide a back rest 136 for a user sitting on the tailgate 20. FIG. 23 shows the cargo bed extender system 22 in the stowed position within the recessed area 80. When in the use position shown in FIG. 22, the recessed area 80 is open to the cargo bed area, which increases a vertical height of the cargo bed area at this location.

Figure 24:
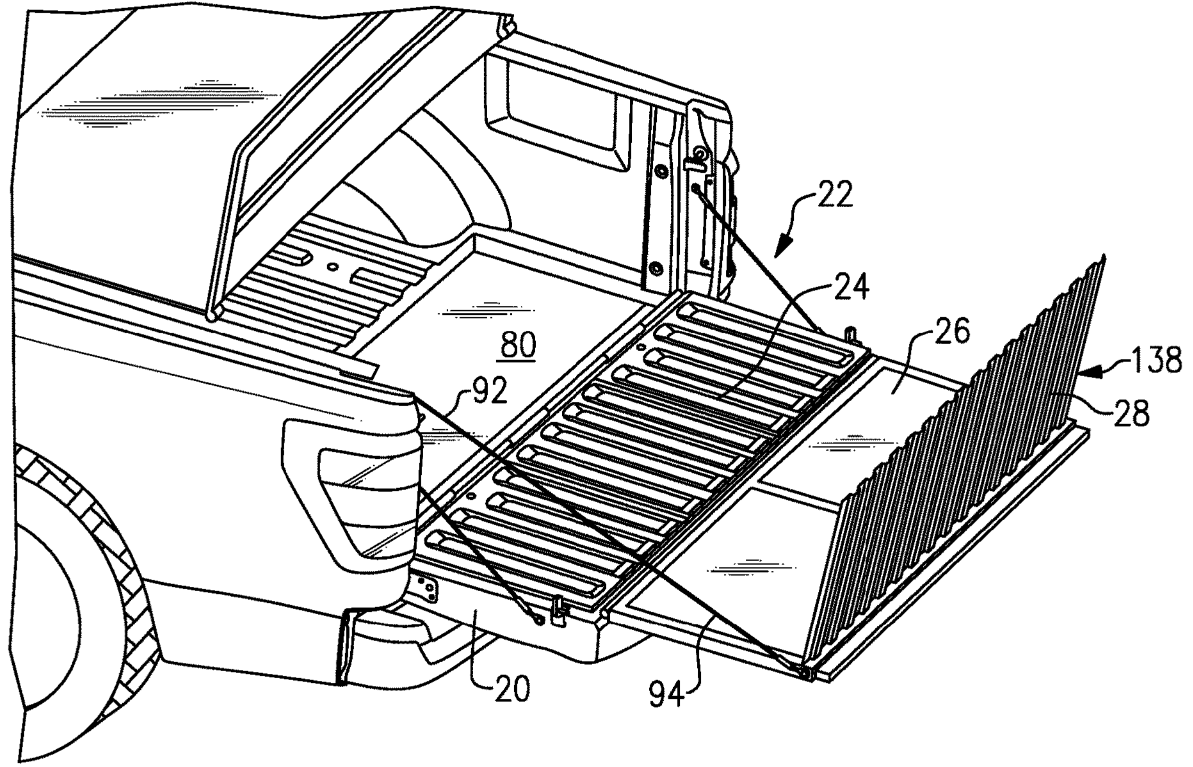
FIG. 24 illustrates a perspective view of the cargo bed extender system in an extended load stop position.

In one example shown in FIG. 24, an extended load stop use position is provided. To achieve this position, the cargo bed extender system 22 is first placed in the further extended work surface position of FIG. 12, and then the box top panel 28 is pivoted upwardly to a vertical position to provide an extended load stop 138.

Figure 25:
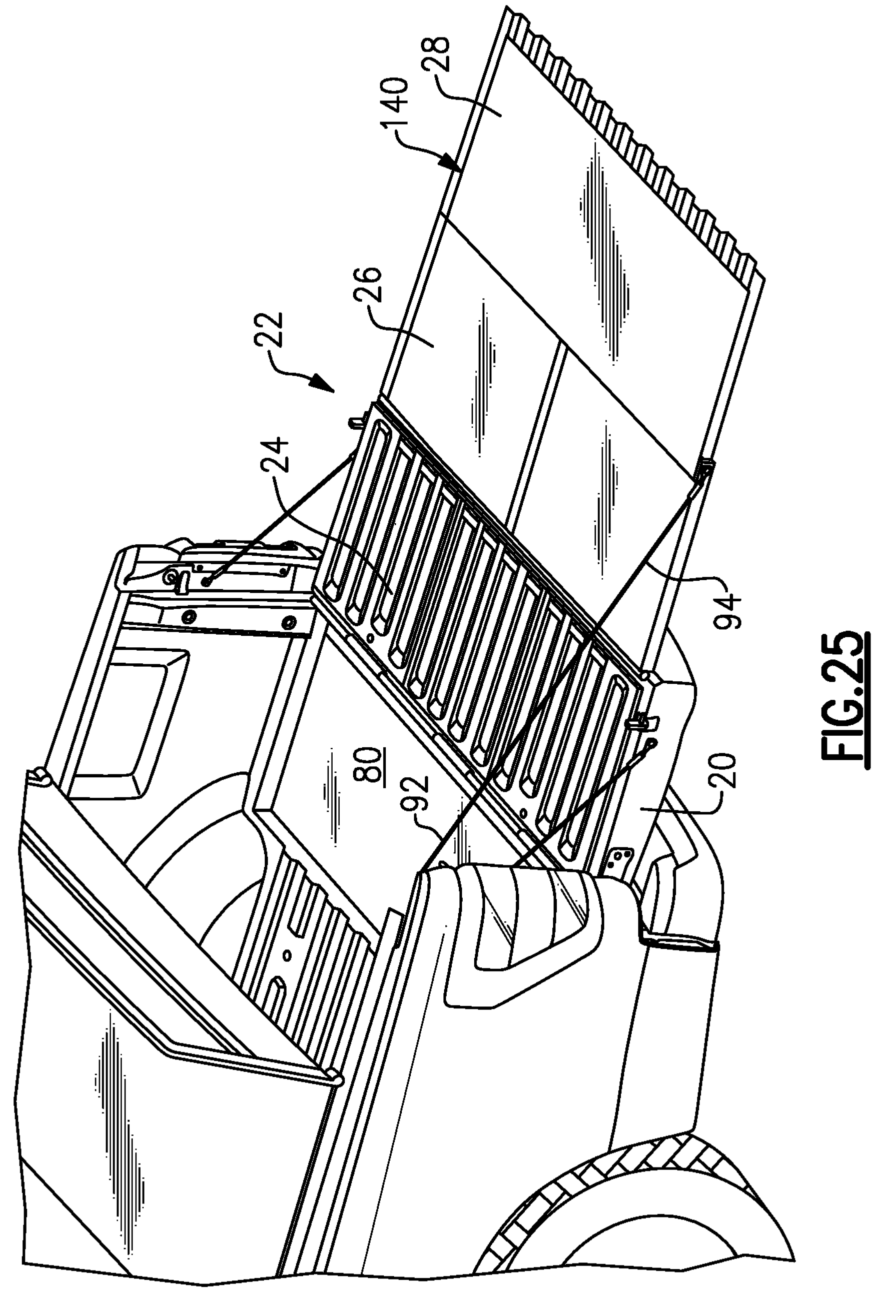
FIG. 25 illustrates a perspective view of the cargo bed extender system in an extended table position.

In one example shown in FIG. 25, the box top panel 28 is pivoted downwardly from the vertical position shown in FIG. 25 to an extended horizontal position to provide a camping or tailgating table 140.

Figure 26:
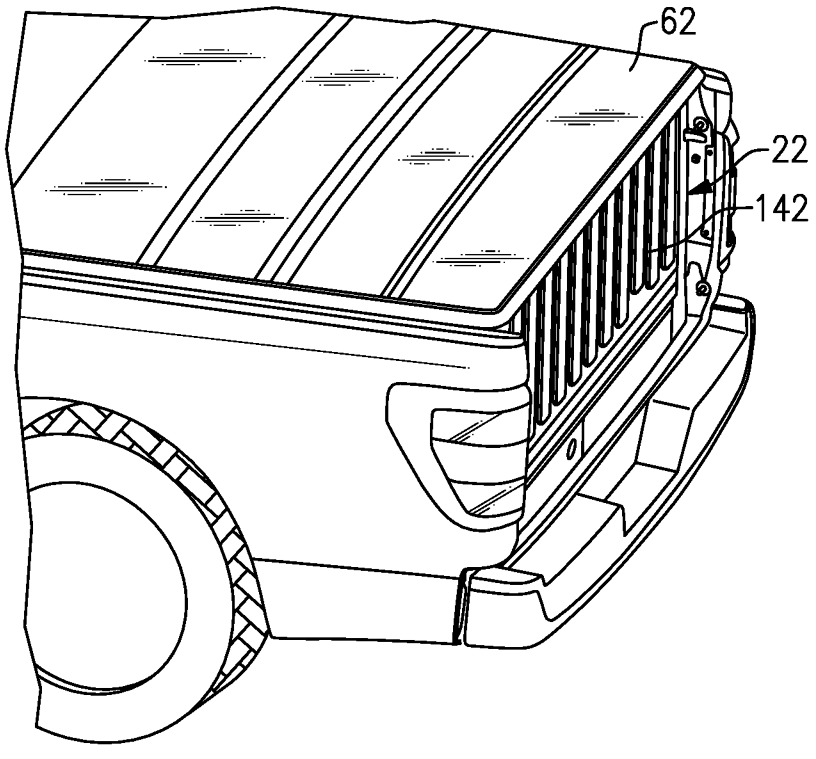
FIG. 26 illustrates a perspective view of the cargo bed extender system in a temporary tailgate position.

In one example shown in FIG. 26, the cargo bed extender system 22 can be used to provide a temporary tailgate 142. In certain circumstances, the tailgate 20 is removed to accommodate different loading conditions/situations. If the situation has passed and the user needs to enclose the back end of the cargo area on a temporary basis, the cargo bed extender system 22 can positioned in an upright position as shown in FIG. 22 to provide a temporary tailgate 142 as shown in FIG. 26.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. A vehicle cargo bed extender system comprising: a plurality of panels coupled together such that the panels are configurable between a plurality of use positions including at least a stowed position and an extended position, wherein when in the stowed position the plurality of panels comprise a stacked set of panels that are stored within a cargo bed floor, and when in the extended position the plurality of panels provide an extended work surface that extends outwardly beyond the cargo bed floor; and a primary hinge directly coupling one panel of the plurality of panels to the cargo bed floor such that all panels of the plurality of panels are pivotable relative to the cargo bed floor as a single unit when moving to the stowed position.

2. The vehicle cargo bed extender system of claim 1, wherein the plurality of use positions further comprises at least one of a cargo divider wall, an aero wing, a load stop, a sealed bed extender, a secured vault, or an extended table surface that extends beyond the extended work surface.

3. The vehicle cargo bed extender system of claim 1, wherein the plurality of use positions comprises at least a cargo divider wall, an aero wing, a load stop, a sealed bed extender, a secured vault, and an extended table surface that extends beyond the extended work surface.

4. The vehicle cargo bed extender system of claim 1, wherein the plurality of panels comprises at least a box bottom panel that is mounted for pivotal movement relative to the cargo bed floor, a box rear panel that is mounted for pivotal movement relative to the box bottom panel, a box top panel that is mounted for pivotal movement relative to the box rear panel, a first side panel that is mounted for pivotal movement relative to the box bottom panel, and a second side panel that is mounted for pivotal movement relative to the box bottom panel.

5. The vehicle cargo bed extender system of claim 4, wherein the box bottom panel comprises a first lateral edge configured to extend along a width of the cargo bed floor, a second lateral edge opposite the first lateral edge, a first longitudinal edge connecting the first lateral edge to the second lateral edge along one side of the box bottom panel, and a second longitudinal edge connecting the first lateral edge to the second lateral edge along an opposite side of the box bottom panel, and including:

- the primary hinge that comprises a single hinge that pivotally couples the first lateral edge of the box bottom panel to the cargo bed floor;
- at least one second hinge that pivotally couple the second lateral edge of the box bottom panel to the box rear panel;
- at least one third hinge that pivotally couples the first longitudinal edge of the box bottom panel to the first side panel;
- at least one fourth hinge that pivotally couples the second longitudinal edge of the box bottom panel to the second side panel; and
- a secondary hinge assembly that pivotally couples the box top panel to the box rear panel.

6. The vehicle cargo bed extender system of claim 5, wherein the primary hinge, the at least one second hinge, the at least one third hinge, the at least one fourth hinge, and the secondary hinge assembly all operate independently of each other.

7. The vehicle cargo bed extender system of claim 4, including at least one mounting bracket that includes at least a first flange to fix the box bottom panel to the cargo bed floor and a second flange that includes the primary hinge that is coupled to the box bottom panel such that the stacked set of panels pivots relative to the cargo bed floor as the single unit when moving to the stowed position.

8. The vehicle cargo bed extender system of claim 4, wherein when the plurality of panels are in the stowed position, the box top panel is generally flush with the cargo bed floor, and wherein to provide a cargo divider wall within a cargo bed area, the box rear panel and box top panel are rotated together as a unit away from the box bottom panel to an upright position.

9. The vehicle cargo bed extender system of claim 4, wherein to provide an aero wing that is extendable outwardly beyond a tailgate when in a tailgate closed position, the plurality of panels are rotated as a unit from the stowed position to an upright vertical position with the box rear panel and box top panel being subsequently rotated as a unit to a horizontal position relative to the box bottom panel which remains in the upright vertical position.

10. The vehicle cargo bed extender system of claim 4, wherein to provide the extended work surface, the plurality of panels are rotated 180 degrees from a first horizontal orientation, within a cargo bed area when in the stowed position, to a second horizontal orientation that extends a work surface beyond a distal edge of the cargo bed area.

11. The vehicle cargo bed extender system of claim 10, wherein to provide a further extended work surface, the plurality of panels are rotated as a unit from the stowed position to an upright vertical position with the box rear panel and box top panel being subsequently rotated as a unit away from the box bottom panel such that the box bottom panel can then be rotated to a horizontal position to provide the work surface, and the unit of the box rear panel and box top panel can be rotated to a horizontal position to provide the further extended work surface that extends outwardly beyond the work surface.

12. The vehicle cargo bed extender system of claim 4, wherein to provide a load stop, the plurality of panels are rotated as a unit from the stowed position to an upright vertical position with the box rear panel and box top panel being subsequently rotated as a unit away from the box bottom panel such that the box bottom panel can then be rotated to a horizontal position to provide an extended cargo bed area, and the unit of the box rear panel and box top panel can be rotated to a vertical position to provide the load stop at a distal end of the extended cargo bed area.

13. The vehicle cargo bed extender system of claim 4, wherein to provide a sealed enclosure, when in a load stop position, the box top panel is rotated away from the box rear panel to a position parallel with the box bottom panel, and the first and second side panels are rotated upwardly relative to the box bottom panel to upright vertical positions to provide the sealed enclosure with only one open end that faces a cargo bed area.

14. The vehicle cargo bed extender system of claim 13, wherein to provide a secured vault, the sealed enclosure is rotated as a single unit into the cargo bed area such that the one open end is enclosed by the cargo bed floor.

15. The vehicle cargo bed extender system of claim 1, including at least one striker loop mounted to one of the plurality of panels, wherein the at least one striker loop is configured to selectively latch to a vehicle tailgate.

16. A vehicle cargo bed system comprising: a floor; first and second side walls extending up from opposing sides of the floor; a tailgate mounted for pivoting movement relative to the floor, wherein the tailgate is moveable between an upright position where the tailgate cooperates with the first and second side walls to enclose an end of a cargo bed area and an open position to allow access to the cargo bed area;

an extender structure mounted for pivoting movement relative to the floor to increase a size of the cargo bed area when the tailgate is in the open position, wherein the extender structure comprises a plurality of panels coupled together such that the panels are configurable between a plurality of use positions including at least a stowed position and an extended position, wherein when in the stowed position the plurality of panels are stored within the floor, and when in the extended position the plurality of panels provide an extended work surface that extends outwardly beyond the floor and a further extended work surface that extends outwardly beyond the tailgate when in the open position; and a primary hinge directly coupling one panel of the plurality of panels to the floor such that all panels of the plurality of panels are pivotable relative to the floor as a single unit when moving to the stowed position.

17. The vehicle cargo bed system of claim 16, wherein when in the stowed position the plurality of panels comprises a stacked set of panels, and including: a recessed area formed within the floor such that when in the stowed position an outermost surface of the stacked set of panels is generally flush with the floor.

18. The vehicle cargo bed system of claim 16, wherein the plurality of panels comprises at least a box bottom panel that is mounted for pivotal movement relative to the floor, a box rear panel that is mounted for pivotal movement relative to the box bottom panel, a box top panel that is mounted for pivotal movement relative to the box rear panel, a first side panel that is mounted for pivotal movement relative to the box bottom panel, and a second side panel that is mounted for pivotal movement relative to the box bottom panel.

19. A method comprising: coupling a plurality of panels together such that the panels are configurable between a plurality of use positions including at least a stowed position and an extended position; directly coupling one panel of the plurality of panels to a cargo bed floor with a primary hinge such that all panels of the plurality of panels are pivotable relative to the cargo bed floor as a single unit when moving to the stowed position; storing the plurality of panels within the cargo bed floor when in the stowed position; pivoting at least a first panel of the plurality of panels to provide an extended work surface that extends outwardly beyond the cargo bed floor when in the extended position; and pivoting at least a second panel of the plurality of panels to provide a further extended surface that extends beyond an open tailgate surface.

20. The method of claim 19, including pivoting the plurality of panels to provide one or more of the following plurality of use positions: at least one of a cargo divider wall, an aero wing, a load stop, a sealed bed extender, a secured vault, or an extended table surface that extends beyond the extended work surface to provide the further extended surface.

21. The method of claim 19, wherein when in the stowed position the plurality of panels comprises a stacked set of panels.

22. The method of claim 19, wherein a plurality of walls surround the cargo bed floor, and including coupling at least one wall of the plurality of walls to the second panel with at least one set of cables when providing the further extended surface.

23. The vehicle cargo bed system of claim 16, wherein a first panel of the plurality of panels provides the extended work surface and a second panel of the plurality of panels provides the further extended work surface, and including at least one set of cables that couple the second panel to the first and second side walls.

24. The vehicle cargo bed extender system of claim 1, wherein the cargo bed floor is surrounded by a plurality of side walls and a tailgate that is moveable between a closed position and an open position, and when in the extended position the plurality of panels are movable to provide a further extended work surface that extends outwardly beyond the tailgate when in the open position.

25. The vehicle cargo bed extender system of claim 24, wherein a first panel of the plurality of panels provides the extended work surface and a second panel of the plurality of panels provides the further extended work surface, and including at least one set of cables that couple the second panel to the plurality of side walls.

26. The vehicle cargo bed extender system of claim 24, wherein at least one of the panels of the plurality of panels includes one or more integrated light strips, and wherein, when providing the further extended work surface, a sensor activates the integrated light strips.

* * * * *